(12) United States Patent  (10) Patent No.: US 7,405,488 B2
Suso  (45) Date of Patent: Jul. 29, 2008

(54) POWER GENERATOR

(75) Inventor: Koji Suso, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 11/504,804

(22) Filed: Aug. 16, 2006

(65) Prior Publication Data

US 2007/0228740 A1  Oct. 4, 2007

(30) Foreign Application Priority Data

Mar. 31, 2006  (JP) .............................. 2006-096409

(51) Int. Cl.
*H02P 9/04* (2006.01)
(52) U.S. Cl. ............................. 290/1 A; 290/52; 307/64
(58) Field of Classification Search .................. 290/1 R, 290/1 A, 2, 52, 43, 54; 307/64
See application file for complete search history.

(56) References Cited

U.S. PATENT DOCUMENTS 5,973,481 A * 10/1999 Thompson et al. .............. 322/7
6,169,334 B1 * 1/2001 Edelman ...................... 290/52
6,392,313 B1 * 5/2002 Epstein et al. ................. 290/52
6,930,402 B1 * 8/2005 Johnson et al. ............. 290/1 R
6,992,401 B1 * 1/2006 Johnson ...................... 290/1 A
7,245,032 B2 * 7/2007 Willets et al. ............... 290/1 A
7,256,506 B2 * 8/2007 Johnson ...................... 290/1 A

FOREIGN PATENT DOCUMENTS

JP  2004-158421  6/2004
JP  2004-194434  7/2004
JP  2004-336995  11/2004

* cited by examiner

*Primary Examiner*—Nicholas Ponomarenko
(74) *Attorney, Agent, or Firm*—Antonelli, Terry, Stout & Kraus, LLP.

(57) ABSTRACT

There is provided a power generator including a plurality of power generation elements, and a fuel supply portion that communicates with the plurality of power generation elements through a fuel supply passage, the plurality of power generation elements are housed in a plurality of independent power generation casings having vent portions, and the plurality of power generation casings are movably connected via a connecting portion so as to enter a housing state where the casings are placed on top of each other and a power generation state where the casings are separated. There is provided a portable power generator that can ensure sufficient ventilation and power generation areas in use (during power generation), and becomes compact when carried.

12 Claims, 27 Drawing Sheets

FIG.23A
FIG.23B
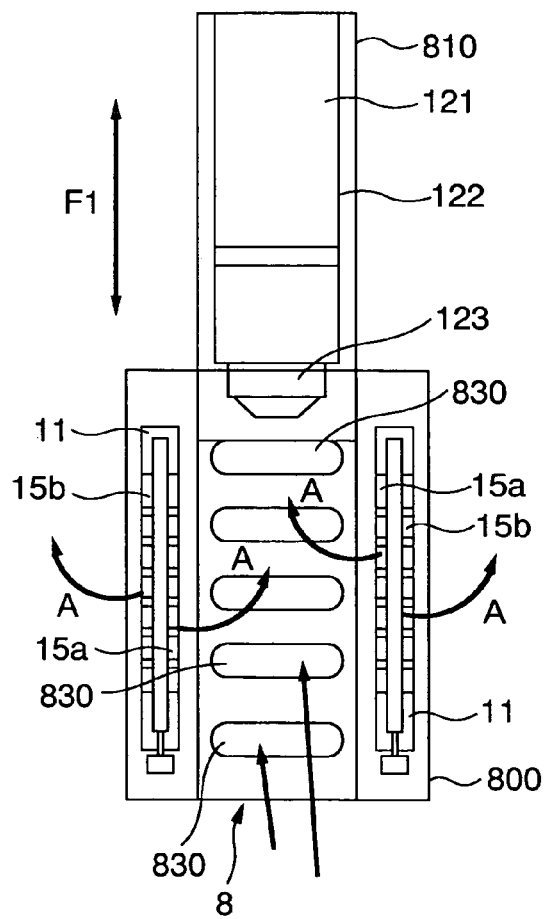
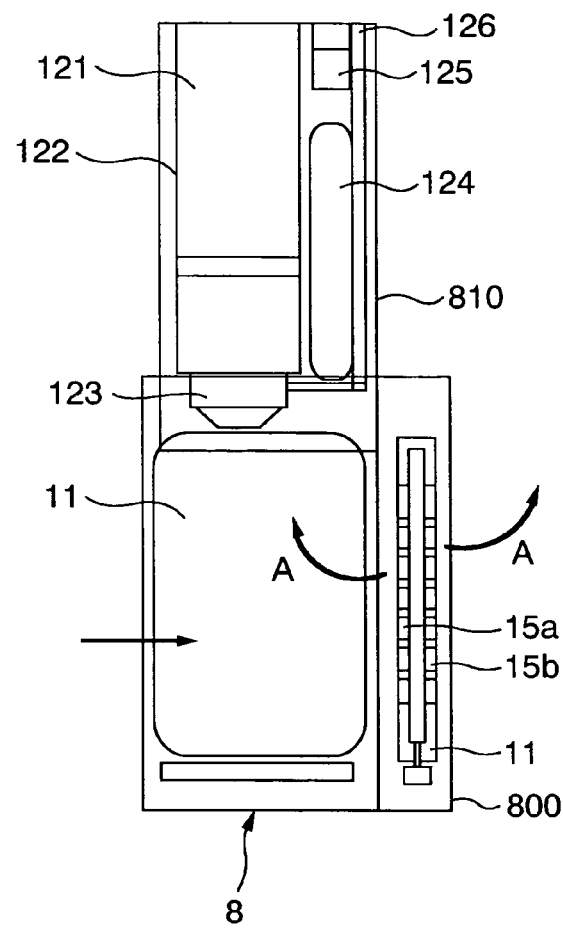

FIG.25A
FIG.25B
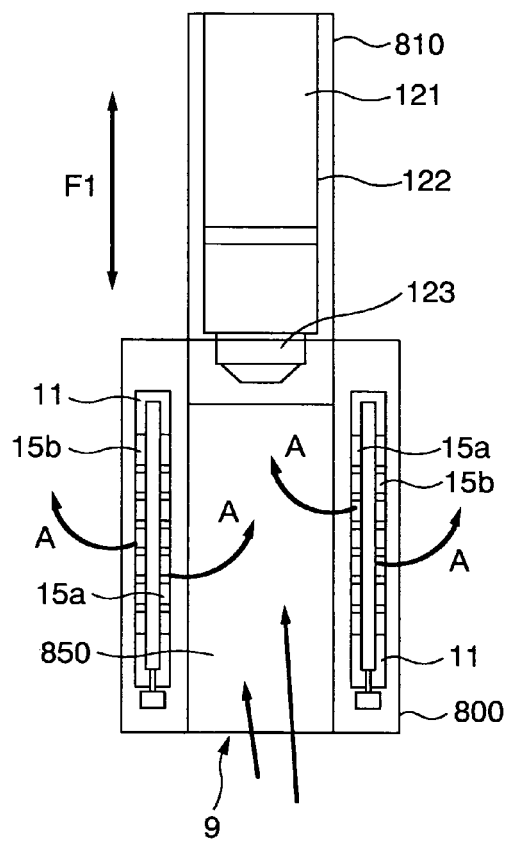
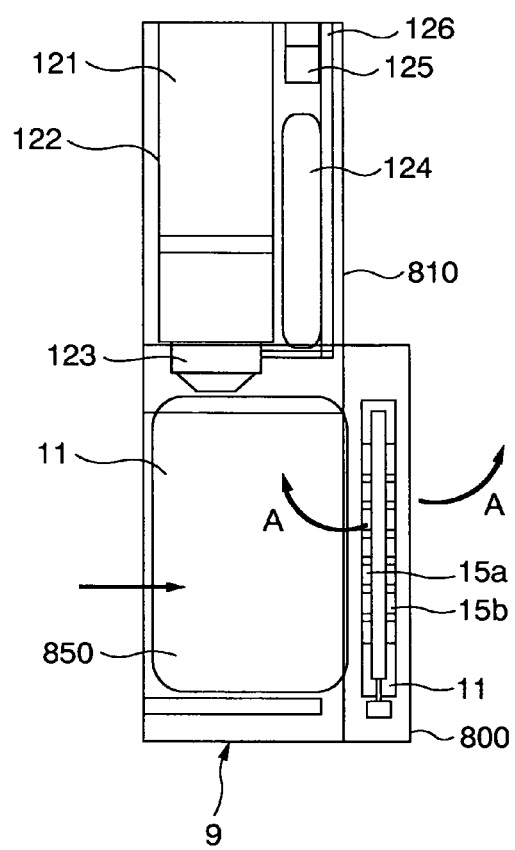

FIG.26A
FIG.26B
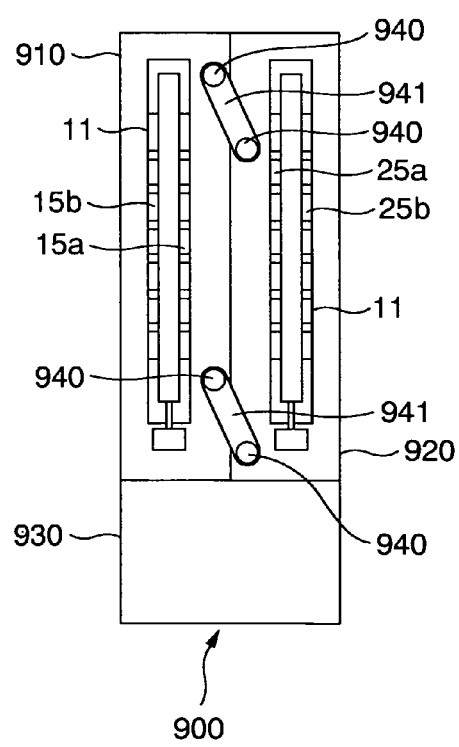
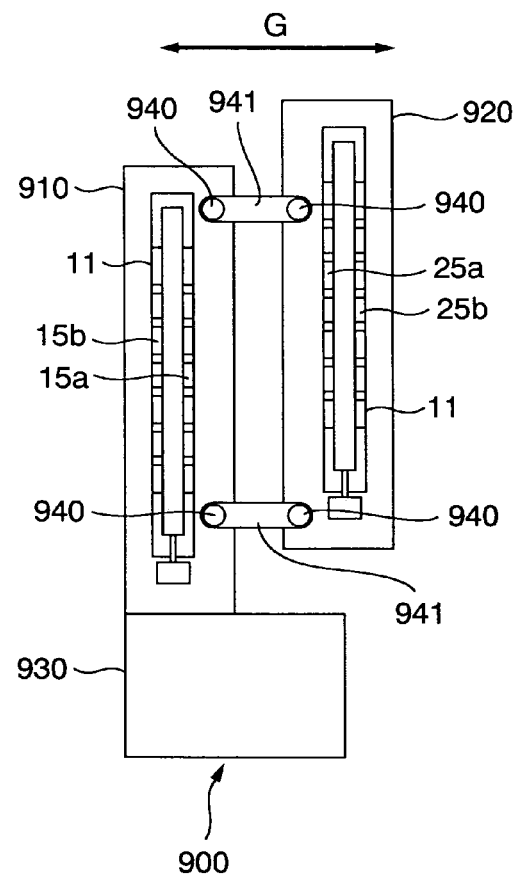

FIG.27A
FIG.27B
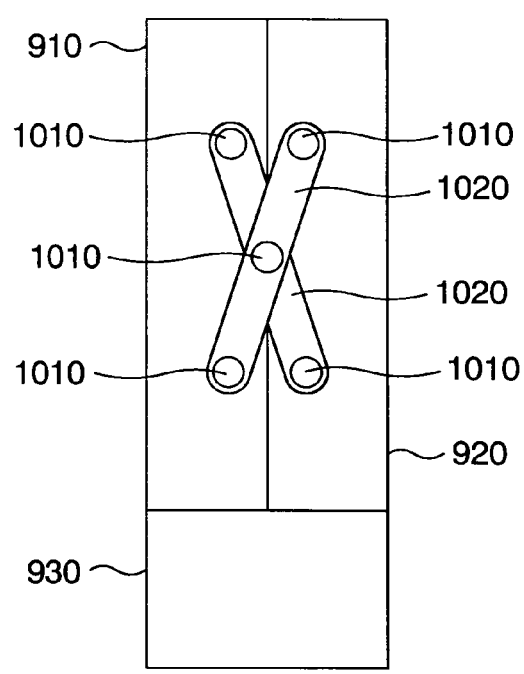
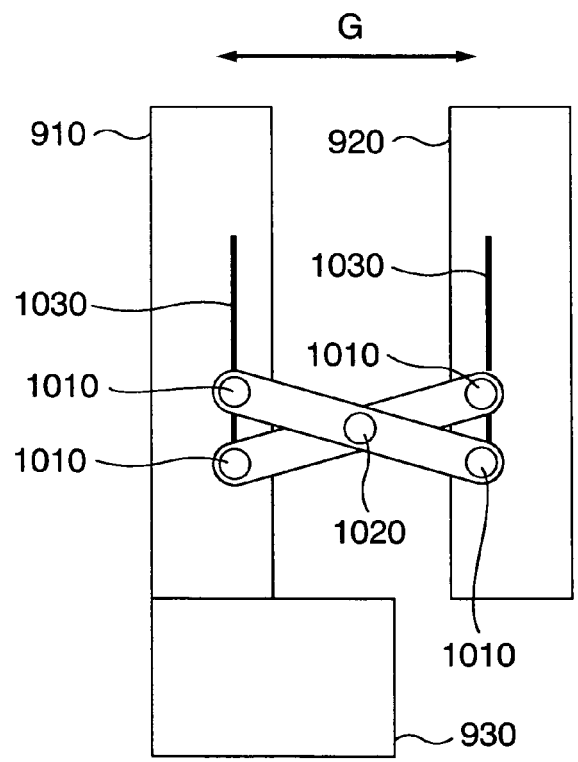

POWER GENERATOR

INCORPORATION BY REFERENCE

The present application claims priority from Japanese application JP2006-096409 filed on Mar. 31, 2006, the content of which is hereby incorporated by reference into this application.

BACKGROUND OF THE INVENTION (1) Field of the Invention

The present invention relates to a portable power generator for charging a compact portable device including a chargeable power supply such as a mobile phone, a personal digital assistant, a shaver, or a portable audio device.

(2) Description of Related Art

In recent years, compact portable devices such as mobile phones or personal digital assistants have become more sophisticated and required a larger amount of electric power. This causes a battery (a secondary battery) used in the compact portable devices to be rapidly exhausted, and the battery needs to be charged at home and also away from home or in transit.

To charge a secondary battery away from home or in transit, portable power supplies that can be quickly charged using a dry cell are commercially available, but the dry cell is disposable to cause a waste of resources and increase costs. A portable power supply using a solar panel has been also proposed, but tends to be affected by the weather.

On the other hand, in recent years, a power generator (a fuel cell) using fuel such as methanol has been noted. The fuel cell can be repeatedly used by adding fuel, and is not affected by the weather.

Such a fuel cell used in a battery charger of a mobile phone has been proposed. See JP-A-2004-158421, JP-A-2004-194434, and JP-A-2004-336995.

The conventional examples using the fuel cell include a flat fuel tank and a flat power supply portion arranged in the front and back, and the mobile phone is removably mounted to the front thereof. In the conventional examples, however, ensuring a sufficient capacity of the fuel tank increases the entire thickness of the charger to prevent a size reduction. Also, the examples do not disclose addition of fuel that is important in usability.

Thus, an object of the present invention is to provide a portable power generator that can ensure the capacity for fuel and can easily add the fuel.

A treatment method of moisture produced during power generation is a problem specific to fuel cells. Moisture produced during power generation has been generally released into the atmosphere as vapor.

In the conventional fuel cell, however, a vent for releasing moisture as vapor is insufficiently formed to prevent an increase in exhaust efficiency. A sufficiently formed vent increases the exhaust efficiency, but also increases the size of the fuel cell itself, which causes the power generator to be less portable.

Thus, another object of the present invention is to provide a portable power generator that can ensure sufficient ventilation and power generation areas in use (during power generation), and becomes compact when carried.

BRIEF SUMMARY OF THE INVENTION

In order to achieve the above described objects, the present invention provides a power generator including: a first power generation casing having a power generation element therein; a second power generation casing having a power generation element therein; and a fuel supply portion that supplies fuel to the first power generation casing and the second power generation casing, wherein the first power generation casing and the second power generation casing are connected via a connecting portion so as to enter a housing state where the casings are placed on top of each other and a power generation state where the casings are separated, and have vent portions provided in inner surfaces that are exposed in the power generation state, the fuel supply portion is mounted to either the first power generation casing or the second power generation casing, and the power generator further includes a switch that switches the first power generation casing and the second power generation casing from the housing state to the power generation state to supply the fuel and start power generation.

The present invention also provides a power generator including: a first power generation casing having a power generation element therein; a second power generation casing having a power generation element therein; and a connecting casing having a fuel supply portion that supplies fuel to the first power generation casing and the second power generation casing, wherein the connecting casing connects one end of the first power generation casing to one end of the second power generation casing so as to enter a first state where the first power generation casing and the second power generation casing are folded and a second state where the first power generation casing and the second power generation casing are opened, the first power generation casing and the second power generation casing have vent portions in inner surfaces that are concealed in the first state and exposed in the second state, and the power generator further includes a switch that switches the first power generation casing and the second power generation casing from the first state to the second state to supply the fuel and start power generation.

The present invention also provides a power generator including: a first power generation casing having a power generation element therein; a second power generation casing having a power generation element therein; a connecting portion that connects the first power generation casing to the second power generation casing; and a main casing having a fuel supply portion that supplies fuel to the first power generation casing and the second power generation casing, wherein the connecting portion connects one end of the first power generation casing to one end of the second power generation casing so as to enter a first state where the first power generation casing and the second power generation casing are folded and a second state where the first power generation casing and the second power generation casing are opened, the first power generation casing and the second power generation casing have vent portions in inner surfaces that are concealed in the first state and exposed in the second state, the main casing has an insertion port for a fuel cartridge that supplies the fuel to the first power generation casing and the second power generation casing, and the power generator further includes a switch that switches the first power generation casing and the second power generation casing from the first state to the second state to supply the fuel from the fuel cartridge and start power generation.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 23A is a front view showing the state of use of the power generator according to the eighth embodiment of the present invention;

FIG. 23B is a right side view showing the state of use of the power generator according to the eighth embodiment of the present invention;

FIG. 25A is a front view showing the state of use of the power generator according to the ninth embodiment of the present invention;

FIG. 25B is a right side view showing the state of use of the power generator according to the ninth embodiment of the present invention;

FIG. 26A is a side view showing a power generator according to a tenth embodiment of the present invention;

FIG. 26B is a side view showing the power generator according to a tenth embodiment of the present invention of the state of use;

FIG. 27A is a side view showing a power generator according to an eleventh embodiment of the present invention; and FIG. 27B is a side view showing the power generator according to an eleventh embodiment of the present invention of the state of use.

DETAILED DESCRIPTION OF THE INVENTION

Figure 1A:
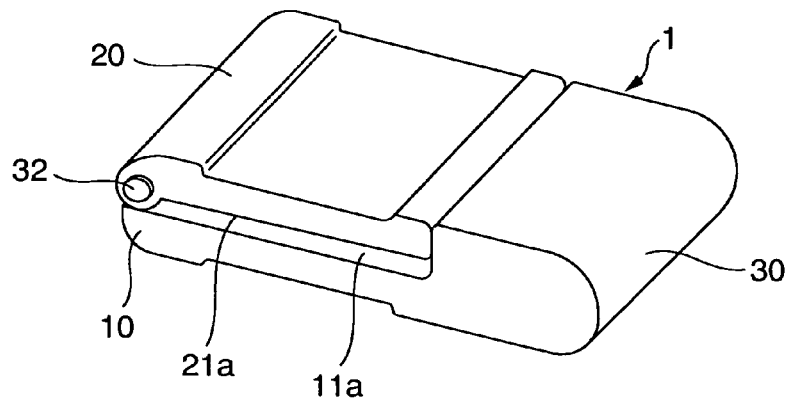
FIG. 1A is a perspective view of a schematic structure of a power generator according to a first embodiment of the present invention.

Now, a portable power generator (a fuel cell) according to the present invention will be described in detail with reference to FIGS. 1 to 27. The same components or the arrows are denoted by the same reference numerals, and overlapping descriptions will be omitted.

(Summary of a Portable Power Generator According to the Present Invention)

A power generator according to the present invention includes a plurality of power generation casings each having a power generation element, a main casing including a board, an external connection terminal, and a fuel supply portion, and a connecting portion that connects the main casing to the plurality of power generation casings. The power generation element according to the present invention is a fuel cell using fuel such as methanol, and has a thin flat appearance. The plurality of power generation casings each have a thin flat appearance in accordance with the power generation element.

The present invention has a significant feature in that the power generation casings each having the thin appearance are connected via a connecting portion so that the form thereof can be changed between a housing state where the power generation casings are placed on top of each other and a power generation state where a space is obtained around the power generation casings. In the present invention, the form of the casings can be changed to be compact and highly portable when housed, and to be suitable for increasing power generation efficiency in use.

In the present invention, the board, the external connection terminal, and the fuel supply portion are collectively placed in the main casing, and thus the power generation elements can be combined in the power generation casings in a compact manner. This reduces limitations on peripheries of the power generation casings in connection with placement of the board or the external connection terminal, and allows large vents to be provided, thereby increasing power generation efficiency and moisture releasing efficiency.

Further, in the present invention, the main casing may be structurally independent of other power generation casings. In this case, the main casing is preferably movably connected to other power generation casings via a connecting portion. The main casing may be integrally formed with one of the power generation casings. In this case, one power generation casing integrally formed with the main casing and the other power generation casing are preferably movable via a connecting portion.

Also, a fuel supply portion is placed in the main casing. A fuel cartridge that can include a predetermined amount of fuel may be provided in the fuel supply portion, or fuel may be supplied to the fuel supply portion from a dropper or other cartridge as required.

In the present invention, the fuel supply portion is placed in one place (the main casing), and the fuel is supplied through a fuel supply passage (a pipe) provided via a connecting portion in one or more power generation casings provided separately from the fuel supply portion. This reduces exposure of a pipe to the appearance of the casing with loss of design, or reduces cuts of the exposed pipe.

The connecting portion can changeably connect the plurality of power generation casings to the main casing with a variety of structures. For example, the connecting portion may use a variety of structures such as a foldable structure, a rotating structure, a sliding structure, a swinging structure, or a structure with part of the casing being extendable. Specifically, the connecting portion used in the present invention may connect the plurality of casings so as to enter a housing state where the casings are placed on top of each other and a power generation state where a space is obtained around the power generation casings. A better connecting portion has a structure such that a fuel supply pipe can be provided in the connecting portion.

Now, typical embodiments of the portable power generator according to the present invention will be described. The illustrated embodiments are typical ones and do not limit the invention.

Embodiment 1

FIGS. 1 to 4 show a portable power generator according to a first embodiment of the present invention. First, a schematic structure of the power generator according to the first embodiment will be described with reference to FIGS. 1 to 3.

Figure 1B:
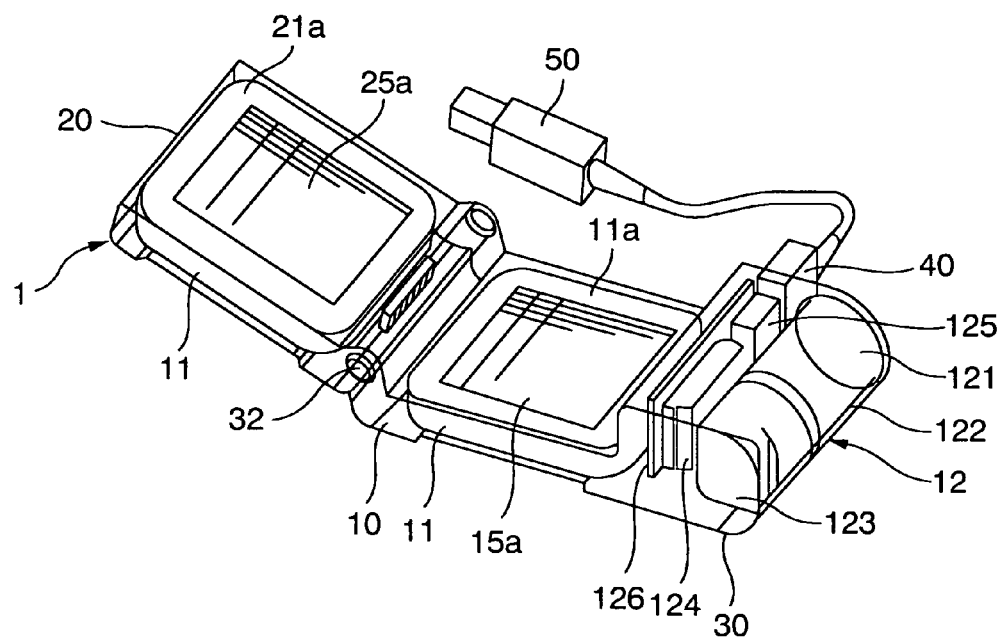
FIG. 1B is a schematic perspective view of an internal layout of the power generator according to the first embodiment of the present invention.
Figure 2A:
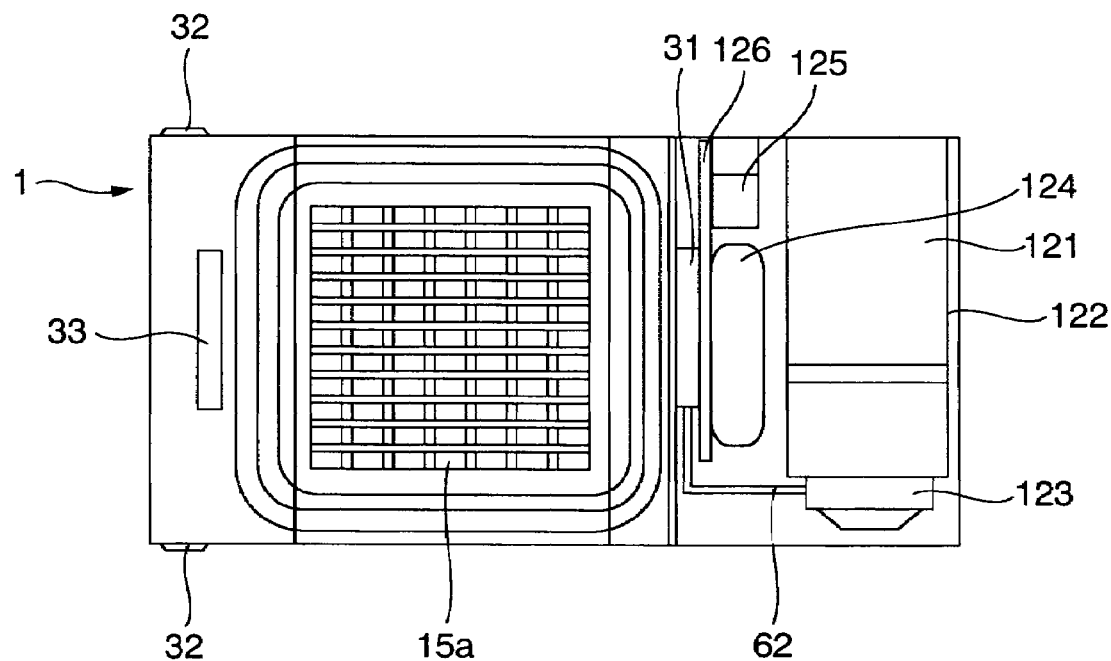
FIG. 2A is a front view showing an internal layout of the power generator according to the first embodiment of the present invention in a closed state.
Figure 2B:
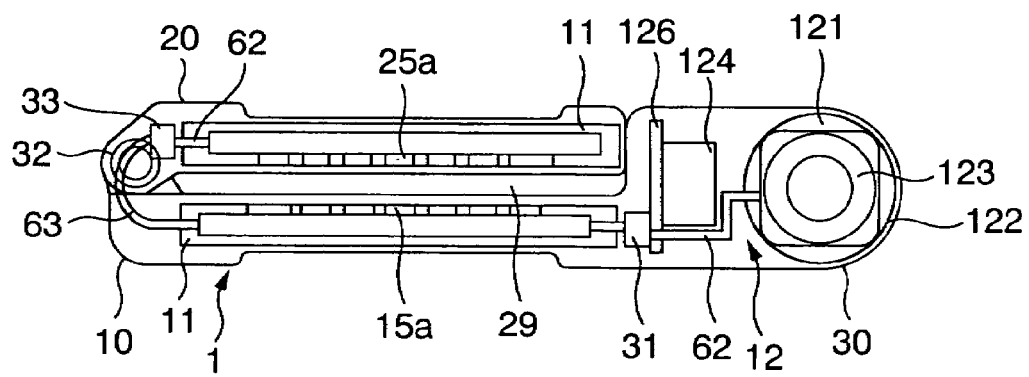
FIG. 2B is a bottom plan view of the power generator according to the first embodiment of the present invention in a closed state.
Figure 3A:
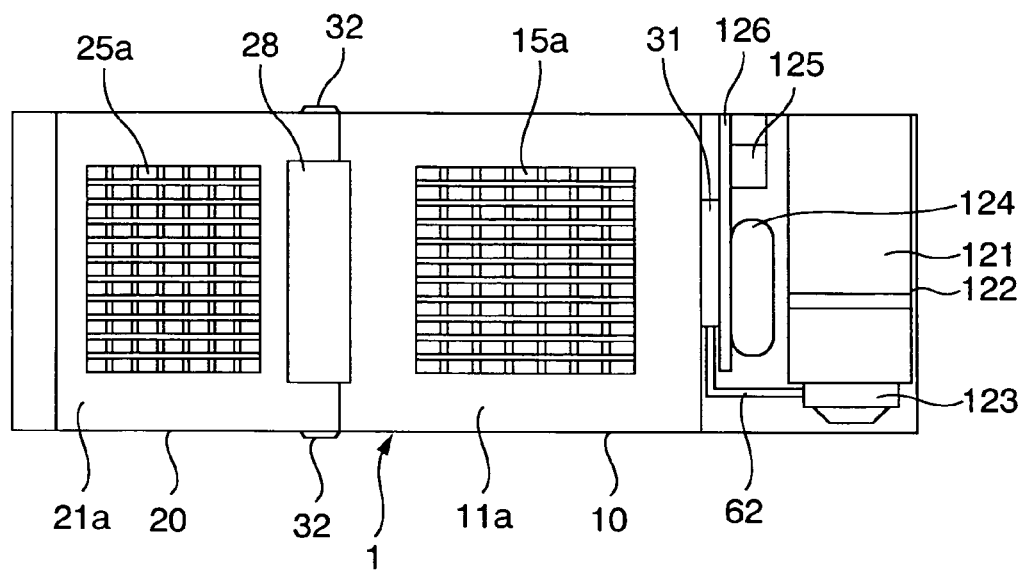
FIG. 3A is a front view showing an internal layout of the power generator according to the first embodiment of the present invention in an opened state.
Figure 3B:
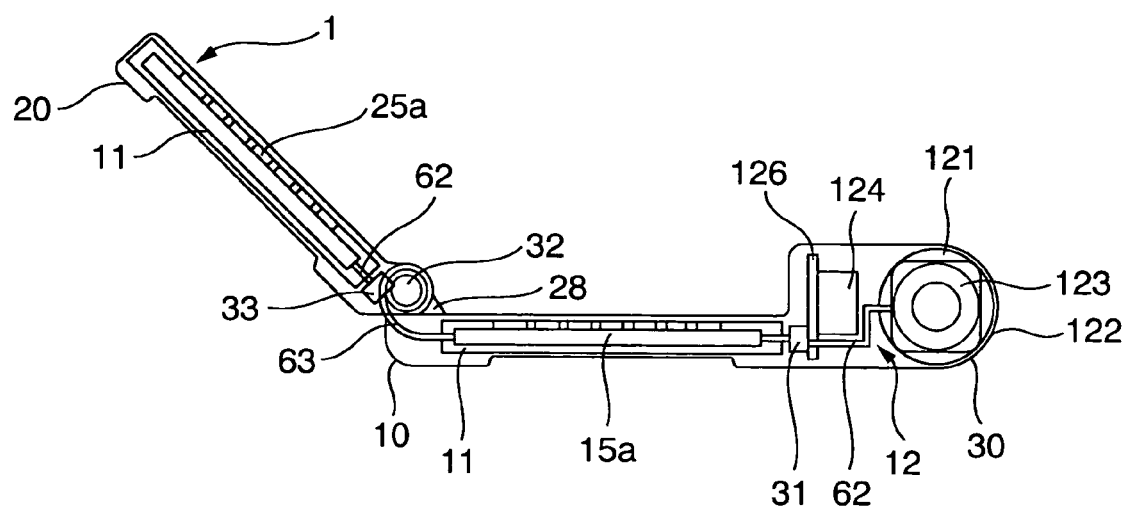
FIG. 3B is a bottom plan view showing an internal layout of the power generator according to the first embodiment of the present invention in an opened state.

FIG. 1 shows a schematic structure of the power generator according to the first embodiment, FIG. 1A is a perspective view of an appearance, and FIG. 1B is a schematic perspective view of an internal layout. FIG. 2 shows an internal layout of the power generator according to the first embodiment in a closed state, FIG. 2A is a front view, and FIG. 2B is a bottom plan view. FIG. 3 shows an internal layout of the power generator according to the first embodiment in an opened state, FIG. 3A is a front view, and FIG. 3B is a bottom plan view.

In FIGS. 1 to 3, the power generator 1 according to the embodiment includes a first power generation casing 10 and a second power generation casing 20 having power generation elements 11 therein, a main casing 30 having a fuel supply portion 12 therein, and a connecting portion that connects the casings.

The connecting portion includes a first connecting portion 31 that connects the main casing 30 to the first power generation casing 10, a second connecting portion 32 that connects the first power generation casing 10 to the second power generation casing 20, and a connector 33 that connects the two power generation elements 11. The second connecting portion 32 openably and closably connects the first power generation casing 10 to the second power generation casing 20 so as to enter a first state where the first power generation casing 10 and the second power generation casing 20 are folded and a second state where the first power generation casing 10 and the second power generation casing 20 are opened.

The first power generation casing 10 and the second power generation casing 20 have vents 15*a* and 25*a* formed in inner surfaces 11*a* and 21*a* that are exposed in the opened state. The second power generation casing 20 has a protrusion 28 provided on the side of the second connecting portion. The protrusion 28 creates a space 29 between the inner surfaces 11*a* and 21*a* of the two power generation casings when folded.

The main casing 30 includes the fuel supply portion 12, a control portion 124 that collectively controls the power generator 1, an external interface 125 connected to an external device, and a main board 126 to which these components are connected.

The fuel supply portion 12 includes a fuel cartridge 121 that supplies fuel, a cartridge housing portion 122 that houses the fuel cartridge 121, and a governor 123 that is provided at an end of the cartridge housing portion 122 and controls the fuel supplied from the fuel cartridge 121.

A charging connector 50 can be connected to the external interface 125 via a USB connector 40, and a compact portable device such as a mobile phone or a personal digital assistant is connected to the charging connector 50 to charge a battery included in the compact portable device.

The first connecting portion 31 is provided at one end of the first power generation casing 10, and connects the first power generation casing 10 to the main casing 30, and has a structure in which a fuel supply passage can be provided.

The connector 33 is provided at one end of the second power generation casing 20 (on the side of the second connecting portion), and connected to a fuel tube 63 provided on the other end of the first power generation casing 10 (on the side of the second connecting portion) to connect the two power generation elements 11. Like the first connecting portion 31, the connector 33 has a structure in which a fuel supply passage can be provided. In the embodiment, fuel supply pipes 62 are provided in the first connecting portion 31 and the connector 33, and the pipe 62 and the fuel tube 63 constitute the fuel supply passage.

In the embodiment, the two power generation casings are foldably (openably and closably) connected by the connecting portion to ensure sufficient surface areas of the power generation elements, that is, sufficient ventilation and power generation areas in use (during power generation). The power generator has a high housing property and high portability when not used (at the stop of power generation). Specifically, as shown in FIG. 3, the first power generation casing 10 and the second power generation casing 20 first enter the second state where the power generation casings are opened to expose the inner surfaces 11*a* and 21*a* of the two casings and open the vents 15*a* and 25*a* in wide ranges. This allows sufficient surface areas of the power generation elements 11 required for power generation to be obtained, and allows moisture produced by the power generation to be efficiently released from the vents 15*a* and 25*a* opened in the wide ranges.

On the other hand, in the first state where the first power generation casing 10 and the second power generation casing 20 are closed, the entire length of the power generator 1 can be reduced as compared with the state where the two casings are opened as shown in FIG. 2, thereby providing high portability and a high housing property. When the two generation casings are folded, the vents 15*a* and 15*b* are concealed to prevent dust from entering the power generation casings.

Particularly in this embodiment, the thickness of the main casing 30 including the fuel supply portion 12 is substantially twice the thickness of the first power generation casing 10 or the second power generation casing 20 having the power generation element 11. Thus, the thickness of the two generation casings placed on top of each other can be set substantially the same as the thickness of the main casing 30. This provides a substantially rectangular compact form having a high housing property when housed, and makes the size of the main casing 30 including the fuel supply portion 12 unnoticeable in use.

Figure 4A:
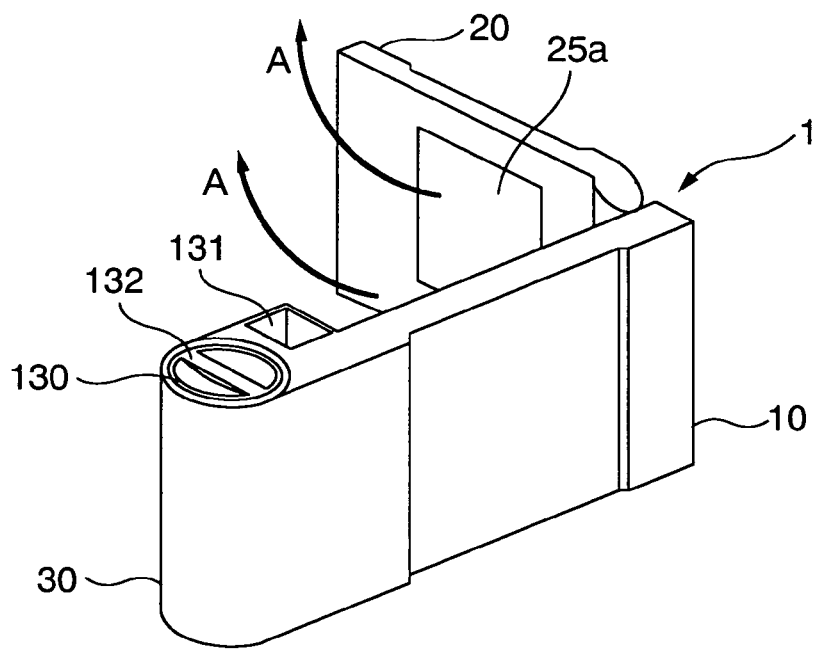
FIG. 4A is a perspective rear view showing the state of use of the power generator according to the first embodiment of the present invention.
Figure 4B:
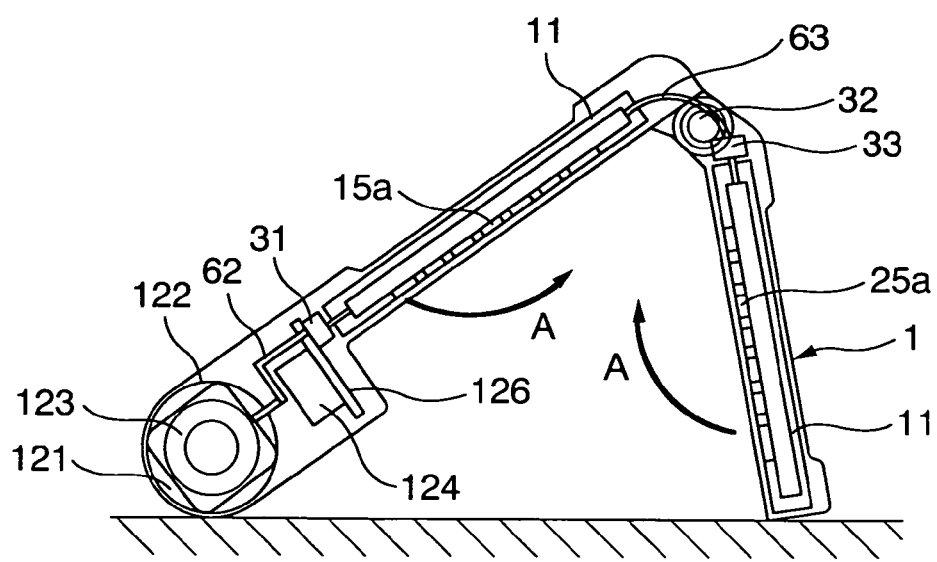
FIG. 4B is a bottom plan view showing the state of use of the power generator according to the first embodiment of the present invention.

Next, the state of use of the power generator according to the first embodiment will be described with reference to FIG. 4. FIG. 4 shows the state of use of the power generator according to the first embodiment, FIG. 4A is a perspective rear view, and FIG. 4B is a bottom plan view of the state of use.

In FIG. 4, a fuel inlet port 130 through which the fuel cartridge 121 is inserted and a connection terminal 131 to which an external device is connected are provided in an upper surface of the power generator 1.

An openable and closable or removable lid 132 is provided in the fuel inlet port 130, and the lid 132 is opened to expose the cartridge housing portion 122, and the fuel cartridge 121 can be removably housed in the cartridge housing portion 122.

The fuel cartridge 121 inserted from the fuel inlet port 130 into the cartridge housing portion 122 is formed of transparent resin material, and the remaining amount of fuel can be confirmed from the periphery. An unshown governor mounting portion is formed at a tip of the fuel cartridge 121. The governor mounting portion is formed to protrude from the tip and provided with an unshown stopper. The stopper is mounted to the governor 123, and thus the governor mounting portion is pushed back inside to supply the fuel to the governor 123.

The governor 123 has a function of supplying the fuel supplied from the fuel cartridge 121 to a power generation portion in an appropriate amount. The governor 123 has an unshown mounting port that fits the governor mounting portion. Rotating the fuel cartridge 121 in a predetermined direction with the governor mounting portion and the mounting port fitted to each other allows the governor 123 and the fuel cartridge 121 to be secured.

On the other hand, when the fuel cartridge 121 is removed, rotating the fuel cartridge 121 in an opposite direction allows the governor mounting portion and the mounting port to be separated to push the fuel cartridge 121 out of the cartridge housing portion 122. A user can pick and take out the fuel cartridge 121 protruding from the power generator 1. The removal structure of the fuel cartridge 121 is not limited to the above described structure.

To the connection terminal 131, the charging connector 50 or the external device is connected directly or via the USB connector 40.

As shown in FIG. 4, the power generator 1 having such a configuration is mainly used in a position such that the vents 15*a* and 25*a* provided in the first power generation casing 10 and the second power generation casing 20 are exposed, that is, a position such that a bottom surface of the power generator 1 comes into contact with a placement surface with the two power generation casings being opened as shown in FIG. 4A, a position such that the other end along the length of the second power generation casing 20 (the side to be opened) and the main casing 30 come into contact with the placement surface as shown in FIG. 4B, or a position as shown in FIG. 3B.

The two power generation casings are opened to turn on an unshown included switch to supply the fuel from the fuel supply portion 12 to perform power generation. Generated electric power is supplied to the compact portable device connected to the power generator 1 to operate the compact portable device or charge the battery. Moisture produced by the power generation is released from the vents 15a and 25a in the direction of arrow A (upward).

This ensures large surface areas of the power generation elements required for power generation to allow power generation to be efficiently performed, and allowing moisture produced by the power generation to be efficiently released from the vents 15a and 25a.

Embodiment 2

Figure 5A:
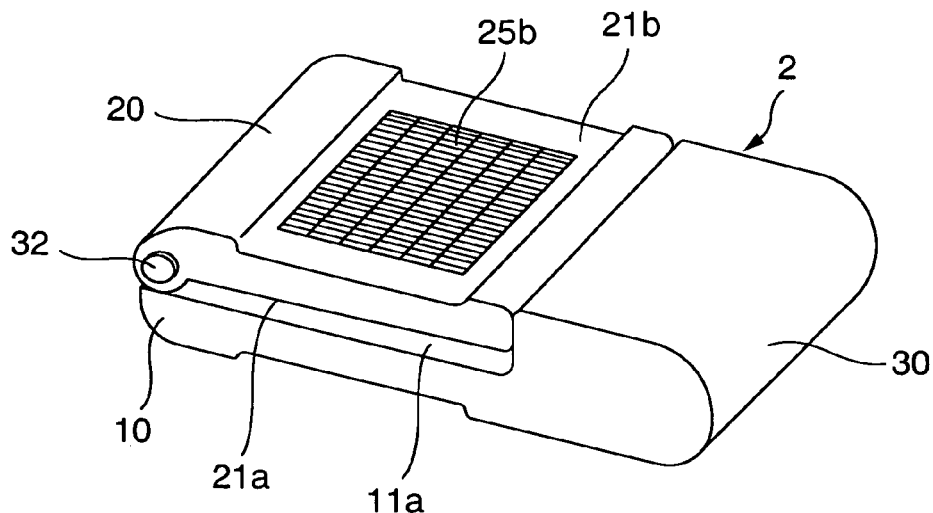
FIG. 5A is a perspective view showing an appearance of a power generator according to a second embodiment of the present invention.
Figure 5B:
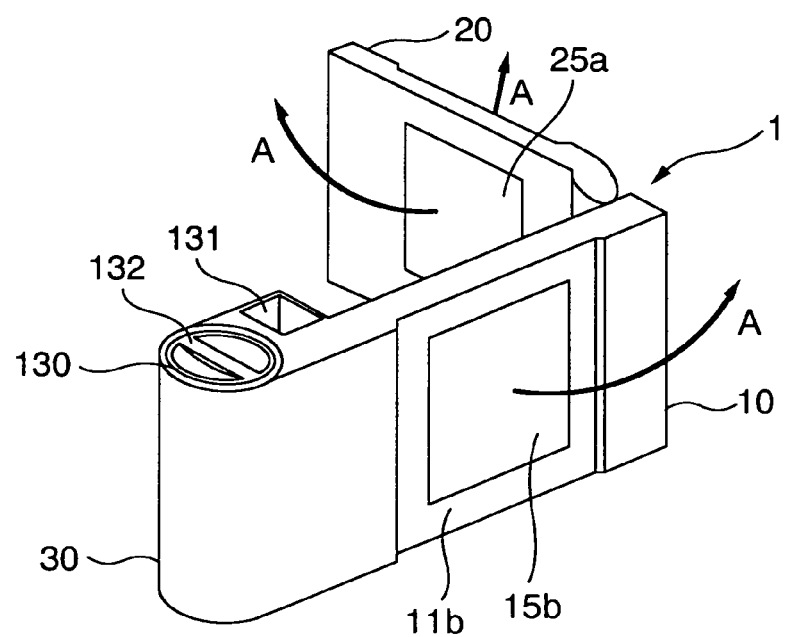
FIG. 5B is a perspective rear view showing a schematic structure of a power generator according to the second embodiment of the present invention.
Figure 6A:
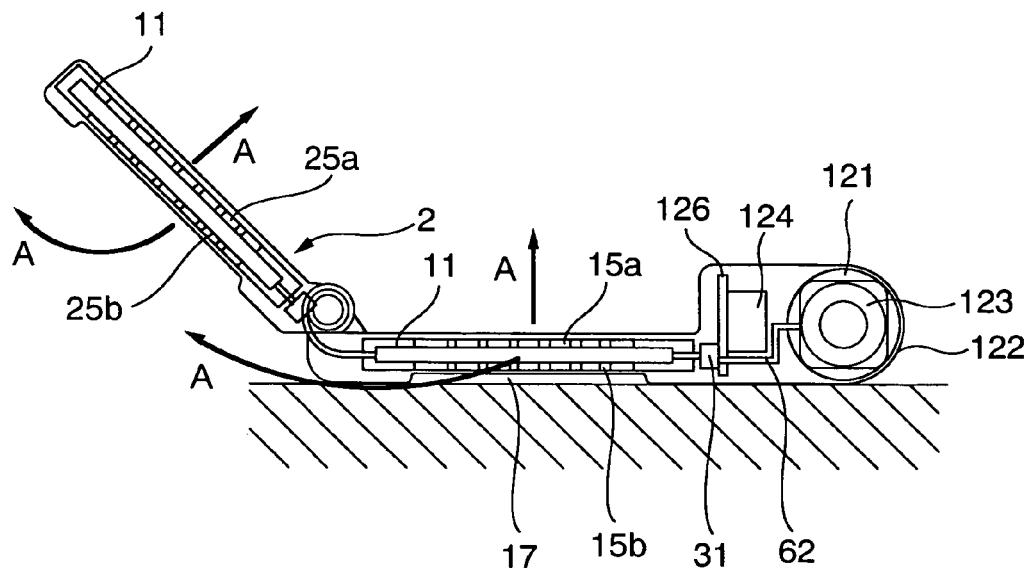
FIG. 6A shows an exhaust structure of the power generator according to the second embodiment of the present invention in an opened state.
Figure 6B:
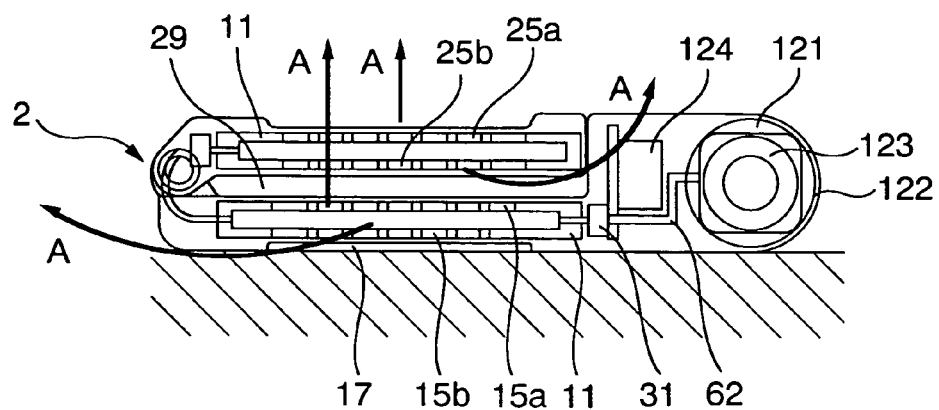
FIG. 6B shows an exhaust structure of the power generator according to the second embodiment of the present invention in a closed state.

Next, a portable power generator according to a second embodiment of the present invention will be described with reference to FIGS. 5 and 6. FIG. 5 shows a schematic structure of the power generator according to the second embodiment, FIG. 5A is a perspective view of an appearance, and FIG. 5B is a perspective rear view. FIG. 6 shows an exhaust structure of the power generator according to the second embodiment, FIG. 6A shows an exhaust structure in an opened state, and FIG. 6B shows an exhaust structure in a closed state.

The power generator according to the second embodiment has a feature in that vents are formed in inner surfaces and outer surfaces of two power generation casings.

In FIGS. 5 and 6, the power generator 2 according to the embodiment includes a first power generation casing 10 and a second power generation casing 20 having power generation elements 11 therein, a main casing 30 having a fuel supply portion 12 therein, and a connecting portion that connects the casings.

The first power generation casing 10 and the second power generation casing 20 have vents 15a and 25a formed in inner surfaces 11a and 21a that are exposed in an opened state, and vents 15b and 25b provided in outer surfaces 11b and 21b of the two power generation casings.

In the power generator 2 having such a configuration, the first power generation casing 10 and the second power generation casing 20 are opened to open the vents 15b and 25b formed in the outer surfaces of the two power generation elements, and the vents 15a and 25a provided in the inner surfaces 11a and 21a of the two power generation casings. At the same time, a switch included in the power generator is turned on to perform power generation with fuel supplied from the fuel supply portion 12. When the power generation is performed in positions shown in FIGS. 5B and 6A, air is taken in from the vents 15a, 15b, 25a and 25b formed in the two power generation casings to cool the power generation elements 11, and release moisture produced by the power generation from the vents 15a, 15b, 25a and 25b in the direction of arrow A (upward).

Particularly, when the power generation is performed in the position in FIG. 6A, air is exhausted from the vent 15b through a space 17 formed between the outer surface 11b of the first power generation casing 10 and a placement surface. The outer surface 11b of the first power generation casing 10 has a recess for forming the space 17.

With such a configuration, the four vents 15a, 25a, 15b and 25b formed in the inner surfaces 11a and 21a and the outer surface 11b and 21b of the two power generation casings can be used, thereby ensuring large surface areas of the power generation elements required for power generation, and allowing moisture produced by the power generation to be efficiently released.

On the other hand, in the state where the two casings are closed, as shown in FIG. 6B, the power generation elements 11 are cooled through the vents 15a, 25a, 15b and 25b, a space 29 formed between the inner surface 11a of the first power generation casing 10 and the inner surface 21a of the second power generation casing 20, and the space 17 formed between the outer surface 11b of the first power generation casing 10 and the placement surface. At the same time, moisture produced by the power generation is released from the vents 15a, 15b, 25a and 25b in the direction of arrow A (upward). With such a configuration, a sufficient amount of air can be supplied to the first power generation casing 10 and the second power generation casing 20 even in the state where the two power generation casings are closed to increase exhaust efficiency.

Embodiment 3

Figure 7A:
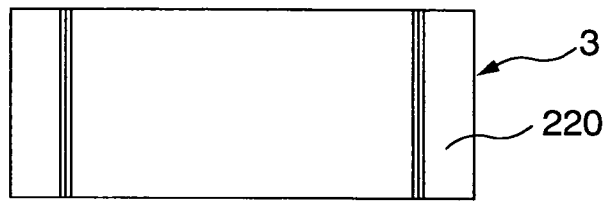
FIG. 7A is a top view showing an appearance of a power generator according to a third embodiment of the present invention.
Figure 7B:
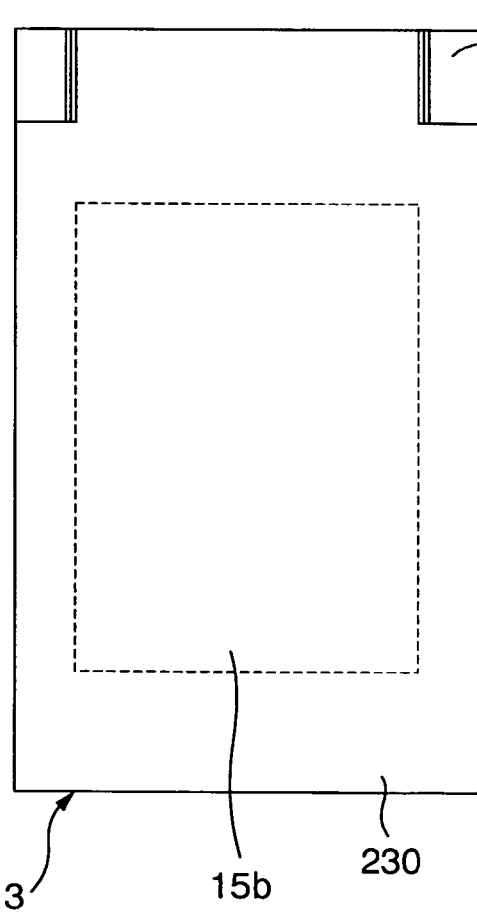
FIG. 7B is a front view showing an appearance of a power generator according to the third embodiment of the present invention.
Figure 7C:
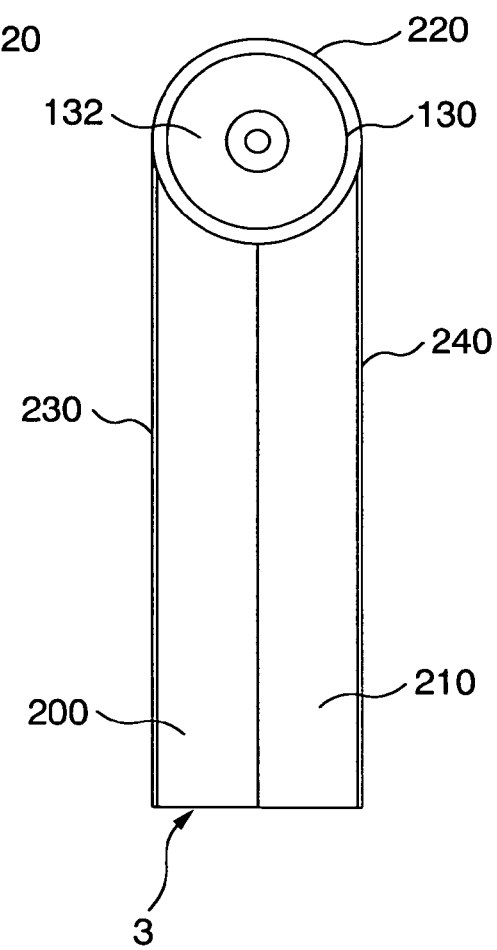
FIG. 7C is a right side view showing an appearance of a power generator according to the third embodiment of the present invention.
Figure 8:
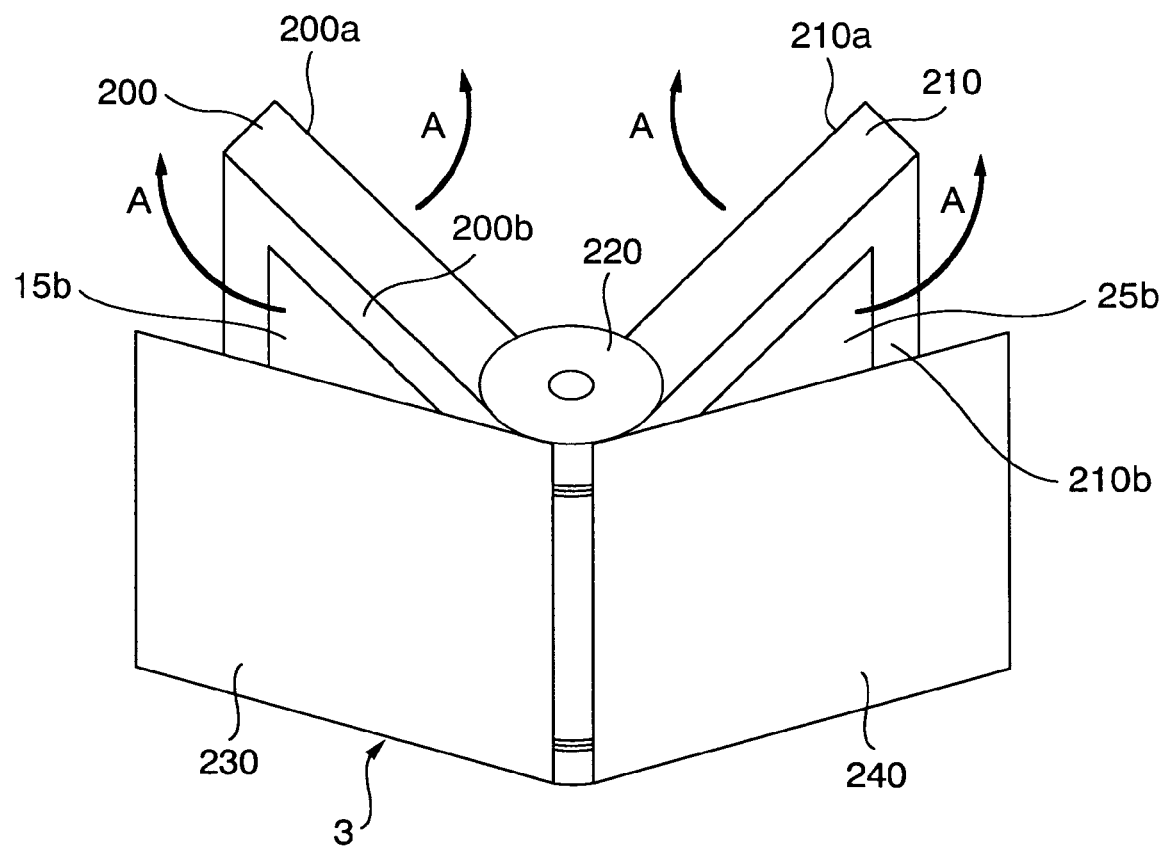
FIG. 8 shows the state of use of the power generator according to the third embodiment of the present invention.
Figure 9A:
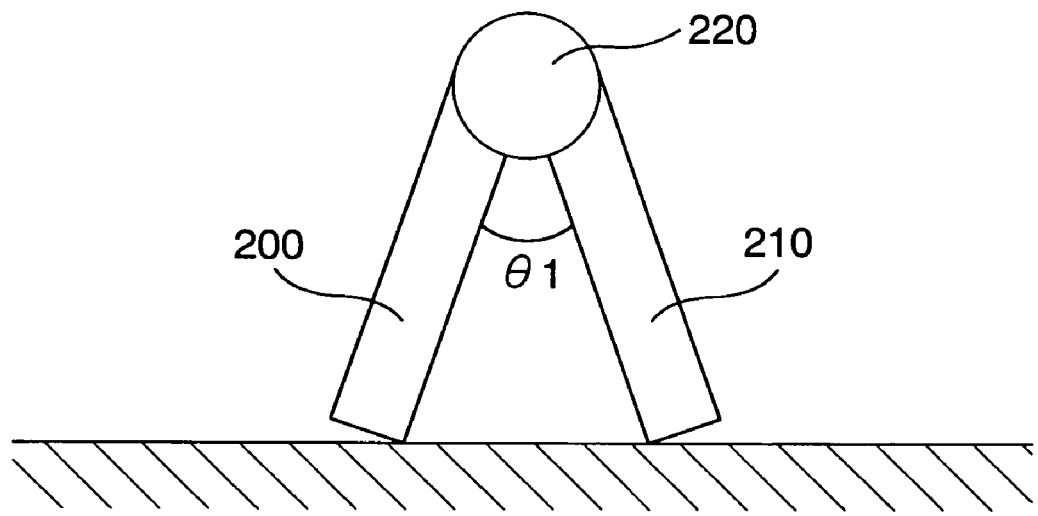
FIG. 9A is a side view showing the state of use of the power generator according to the third embodiment of the present invention of a state with a small opening angle.
Figure 9B:
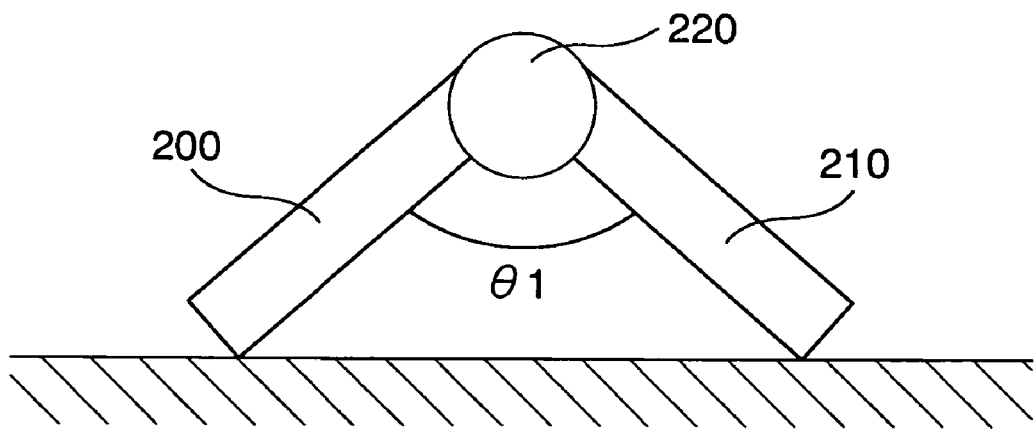
FIG. 9B is a side view showing the state of use of the power generator according to the third embodiment of the present invention of a state with a large opening angle.
Figure 10:
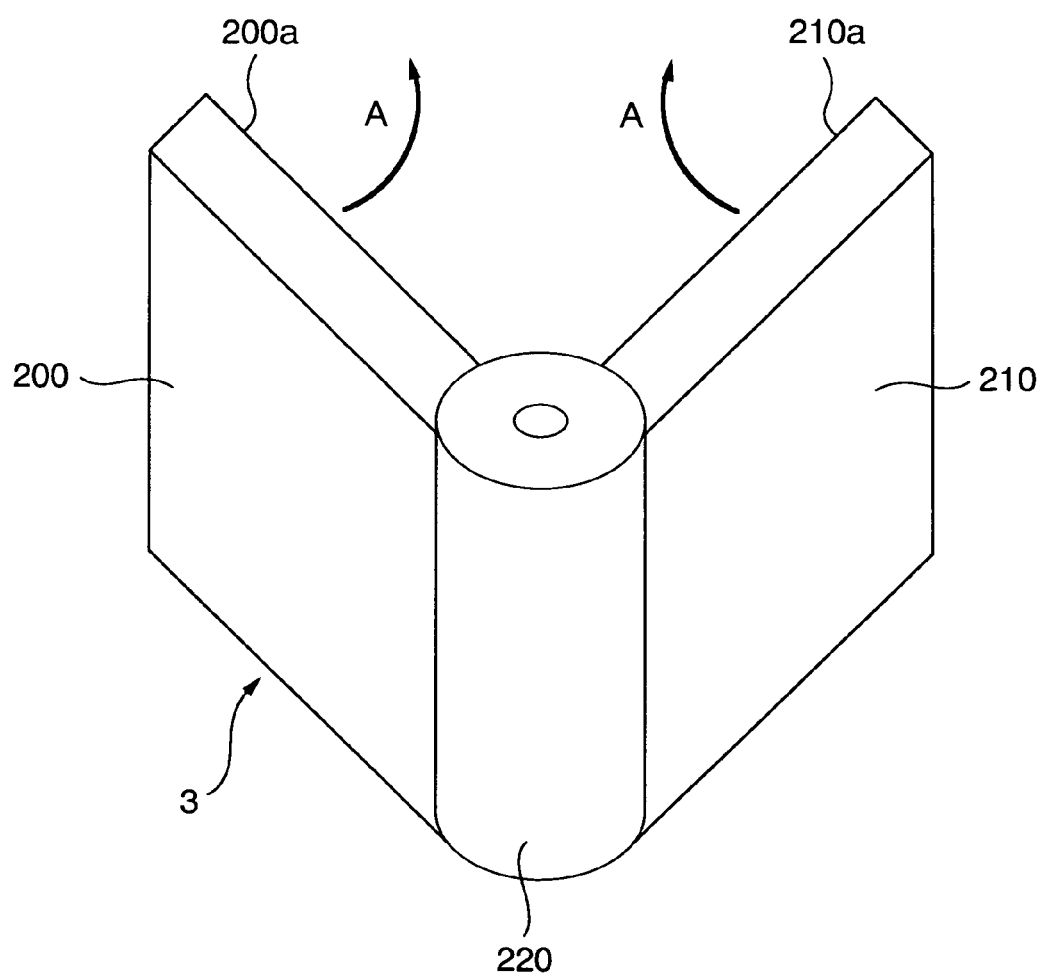
FIG. 10 shows a modified example of the power generator according to the third embodiment of the present invention.

Next, a portable power generator according to a third embodiment of the present invention will be described with reference to FIGS. 7 to 10. FIG. 7 shows an appearance of the power generator according to the third embodiment, FIG. 7A is a top view, FIG. 7B is a front view, and FIG. 7C is a right side view. FIG. 8 shows the state of use of the power generator according to the third embodiment. FIG. 9 schematically shows the state of use of the power generator according to the third embodiment, FIG. 9A is a side view of a state with a small opening angle, and FIG. 9B is a side view of a state with a large opening angle. FIG. 10 shows an modified example of the power generator according to the third embodiment.

The power generator according to the third embodiment has a feature in that a fuel supply portion (a main casing) has a connecting mechanism, and a first power generation casing and a second power generation casing are openably and closably connected using the fuel supply portion as a pivot.

In FIGS. 7 and 8, the power generator 3 according to the embodiment includes a first power generation casing 200 having a power generation element 11 therein, a second power generation casing 210 having a power generation element 11 therein, and a fuel supply portion 220 that openably and closably connects the two casings. An internal configuration of the fuel supply portion 220 is the same as in the first embodiment, and detailed descriptions thereof will be omitted.

The first power generation casing 200 includes a vent 15a formed in an inner surface 200a (see FIG. 1), a vent 15b formed in an outer surface 200b, and a lid portion 230 provided to cover the vent 15b. The second power generation casing 210 includes a vent 25a formed in an inner surface 210a, a vent 25b formed in an outer surface 210b, and a lid portion 240 provided to cover the vent 25b.

The lid portions 230 and 240 are openably and closably mounted using the fuel supply portion 220 as a pivot, and opened during power generation to open the vents 15b and 25b, thereby ensuring surface areas of the power generation elements required for power generation, and allowing moisture produced by the power generation to be released from the vents 15b and 25a.

On the other hand, at the stop of the power generation, the lid portions 230 and 240 are closed to prevent the power generation elements 11 from drying, and prevent dust from adhering to the power generation elements 11 and the vents 15b and 25b.

The fuel supply portion 220 may have a structure including the fuel cartridge. In this case, a connection terminal 131 (see FIG. 4) is provided at one end along the length, and a fuel inlet port 130 is provided at the other end. According to the embodiment, the fuel supply portion 220 can be formed into a cylindrical shape, and can house a cylindrical fuel cartridge in a compact manner. The two power generation casings can be folded along an outer periphery of the cylindrical shape, which simplifies a structure of a connecting portion.

In the embodiment, the diameter of the cylindrical shape is substantially the same as the thickness of the two casings placed on top of each other. This provides a substantially rectangular compact form having a high housing property when housed, and makes the size of the fuel supply portion 220 unnoticeable in use.

Next, a power generation operation of the power generator according to the third embodiment will be described. In the power generator 3 according to the embodiment, the two casings are opened at a predetermined angle, for example, 45 degrees to turn on an unshown switch included in the power generator 3 and start power generation. With the start of the power generation, the lid portions 230 and 240 are opened to open the vents 15b and 25b.

During the power generation, the power generation elements 11 are cooled by air taken in from the vents 15b and 25b, and moisture produced by the power generation is released from the vents 15a and 25a in the direction of arrow A (upward). Particularly, the power generator 3 according to the embodiment can be used in an opened and standing state as shown in FIG. 9, and an opening angle θ1 between the two casings is desirably 30 degrees<θ1<90 degrees in consideration of balance in the standing state.

Such a configuration allows natural convection to easily occur, and allows a fuel cell (a power generation portion) to be sufficiently cooled without heat being accumulated. Further, a chimney effect facilitates the natural convection.

In the embodiment, the structure in which the two casings are tightly closed by the pair of lid portions 230 and 240 is used, but as shown in FIG. 10, a simpler structure may be used with the pair of lid portions 230 and 240 being removed. Also with such a configuration, power generation can be performed as in the above described embodiment, and the same advantages can be obtained.

Embodiment 4

Figure 11A:
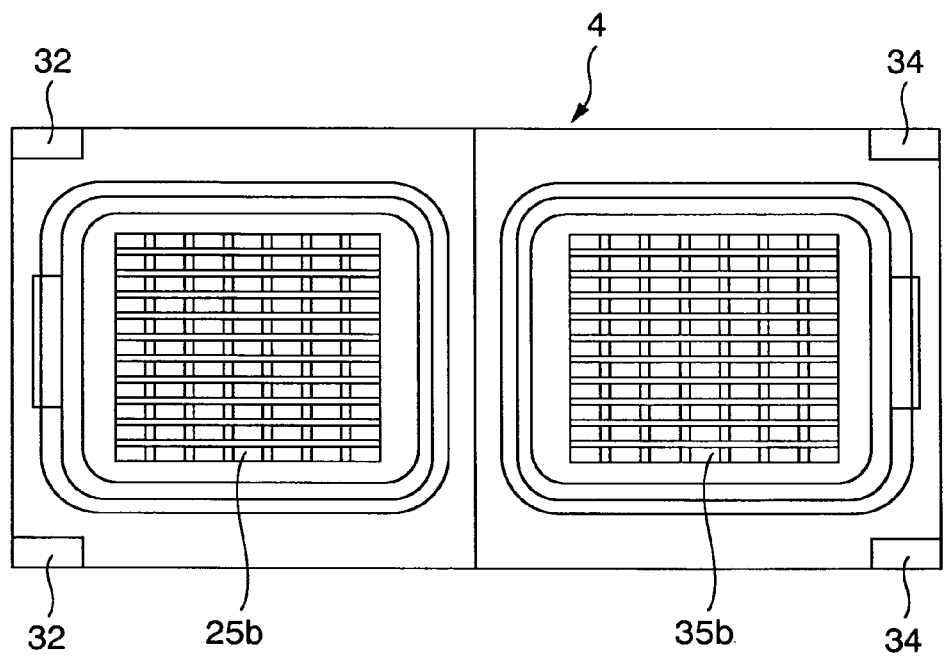
FIG. 11A is a front view showing an internal layout of a power generator according to a fourth embodiment of the present invention in a closed state.
Figure 11B:
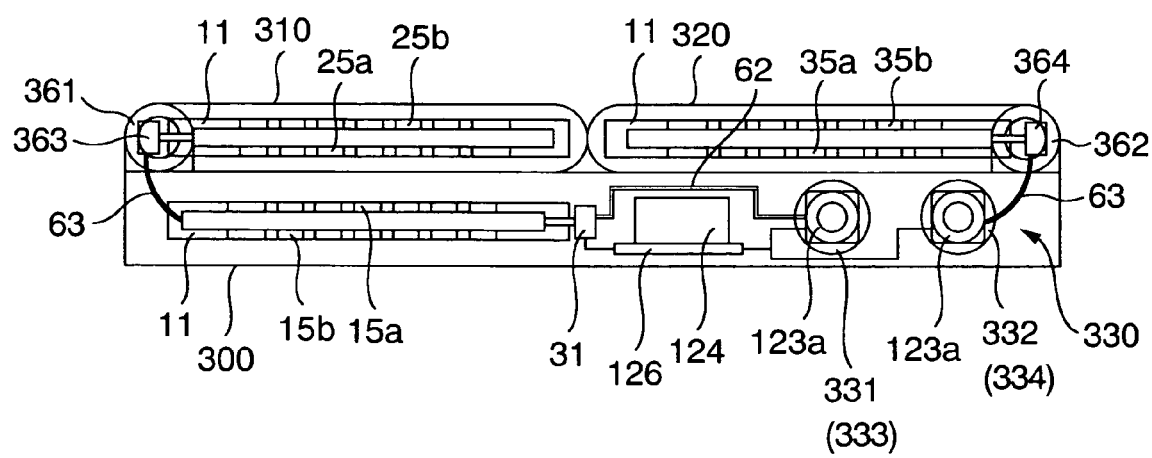
FIG. 11B is a bottom plan view showing an internal layout of a power generator according to the fourth embodiment of the present invention in a closed state.
Figure 12:
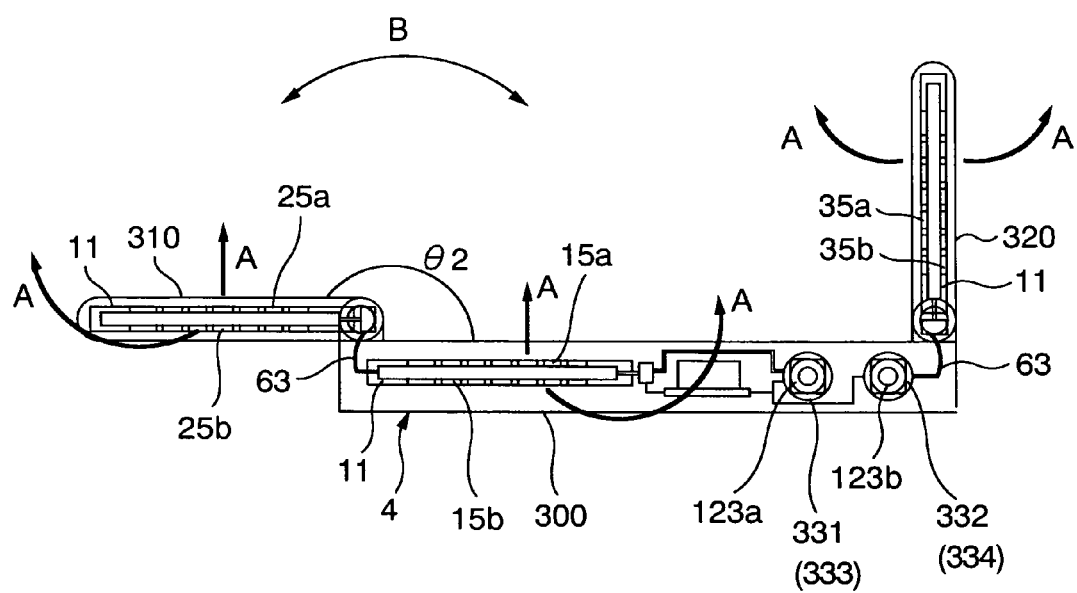
FIG. 12 shows an internal layout of the power generator according to the fourth embodiment of the present invention in an opened state.

Next, a portable power generator according to a fourth embodiment of the present invention will be described with reference to FIGS. 11 and 12. FIG. 11 shows an internal layout of the power generator according to the fourth embodiment in a closed state, FIG. 11A is a front view, and FIG. 11B is a bottom plan view. FIG. 12 shows an internal layout of the power generator according to the fourth embodiment in an opened state.

The power generator according to the fourth embodiment has a feature in that three generation casings each having a power generation element are openably and closably connected via a connecting portion.

In FIGS. 11 and 12, the power generator 4 according to the embodiment includes a first power generation casing 300 having a power generation element 11 and a fuel supply portion 330 therein, a second power generation casing 310 and a third power generation casing 320 having power generation elements 11 therein, and a connecting portion that connects the three generation casing. A configuration of the second power generation casing 310 is the same as in the first embodiment, and detailed descriptions thereof will be omitted. A configuration of the third power generation casing 320 is the same as the configuration of the second power generation casing 310, and detailed descriptions thereof will be omitted.

The fuel supply portion 330 includes a first fuel cartridge 331 that supplies fuel to the first power generation casing 300, a second fuel cartridge 332 that supplies fuel to the second power generation casing 310, a first cartridge housing portion 333 that houses the first fuel cartridge 331, and a second cartridge housing portion 334 that houses the second fuel cartridge 332.

The first cartridge housing portion 333 includes, at an end thereof, a first governor 123a that controls the fuel supplied from the first fuel cartridge 331. The second cartridge housing portion 334 includes, at an end thereof, a second governor 123b that controls the fuel supplied from the second fuel cartridge 332.

The first power generation casing 300 includes the power generation element 11, the fuel supply portion 330, a control portion 124 that collectively controls the power generator 4, an external interface 125 connected to an external device, and a main board 126 to which these components are mounted.

The connecting portion includes a first connecting portion 31 that connects the power generation element 11 to the fuel supply portion 330 inside the first power generation casing 300, a second connecting portion 361 that openably and closably connects the first power generation casing 300 to the second power generation casing 310, a third connecting portion 362 that openably and closably connects the first power generation casing 300 to the third power generation casing 320, a first connector 363 that connects the power generation element 11 of the first power generation casing 300 to the power generation element 11 of the second power generation casing 310, and a second connector 364 that connects the fuel supply portion 330 to the power generation element 11 of the third power generation casing 320.

Configurations of the second connecting portion 361 and the third connecting portion 362 are the same as in the first embodiment, and detailed descriptions thereof will be omitted.

The first connecting portion 31 has a structure in which a fuel supply passage (a pipe 62) can be provided, and is connected via the pipe 62 to the first governor 123a to which the first fuel cartridge 331 is mounted, and the fuel is supplied from the first governor 123a to the power generation element 11 through the pipe 62.

The first connector 363 has a structure in which a fuel supply passage can be provided, and is connected to one end of a fuel tube 63 placed so as to surround the second connecting portion 361. The other end of the fuel tube 63 is connected to the power generation element 11 of the first power generation casing 300 to connect the two power generation elements 11, and the fuel supplied from the fuel supply portion 330 is supplied to the second power generation casing 310 through the fuel tube 63.

The second connector 364 has a structure in which a fuel supply passage can be provided, and is connected to one end of the fuel tube 63 placed so as to surround the second connecting portion 361. The other end of the fuel tube 63 is connected to the second governor 123b to connect the fuel supply portion 330 and the power generation element 11 of the third power generation casing 320, and the fuel supplied from the fuel supply portion 330 is supplied to the third power generation casing 320 through the pipe 62 and the fuel tube 63.

As shown in FIG. 12, in the power generator 4 according to the embodiment, the second power generation casing 310 and the third power generation casing 320 can be opened and closed within a range of 0 degree<θ2<180 degrees in the direction of arrow B with respect to the first power generation casing 300.

In the power generator 4 with such a configuration, for example, the second power generation casing 310 and the third power generation casing 320 are rotated in the direction of arrow B to open vents 15a and 25a provided in inner surfaces and outer surfaces of the two power generation casings, and turn on a switch included in the power generator 4 to perform power generation. Then, generated electric power is supplied to a compact portable terminal such as a mobile phone or a personal digital assistant, and moisture produced by the power generation is released from vents 15a, 15b, 25a and 25b in the direction of arrow A.

With such a construction, large surface areas of the power generation elements required for power generation can be ensured, thereby allowing moisture produced by the power generation to be efficiently released. Further, the second power generation casing 310 and the third power generation casing 320 can be folded and housed at the stop of the power generation, thereby providing a compact form.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

Embodiment 5

Figure 13A:
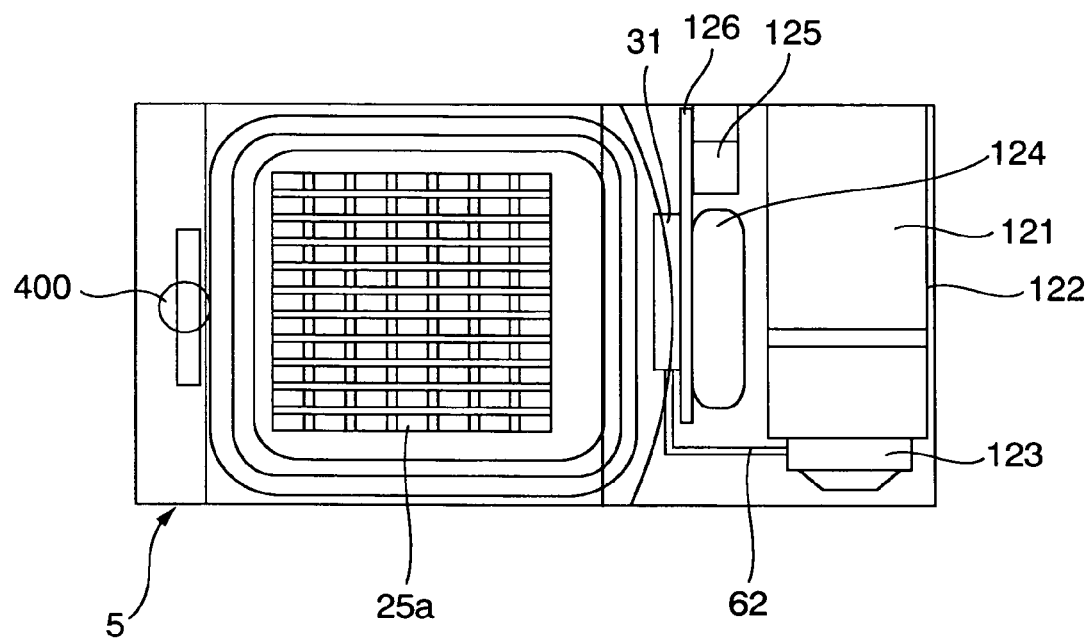
FIG. 13A is a front view showing an internal layout of a power generator according to a fifth embodiment of the present invention in a closed state.
Figure 13B:
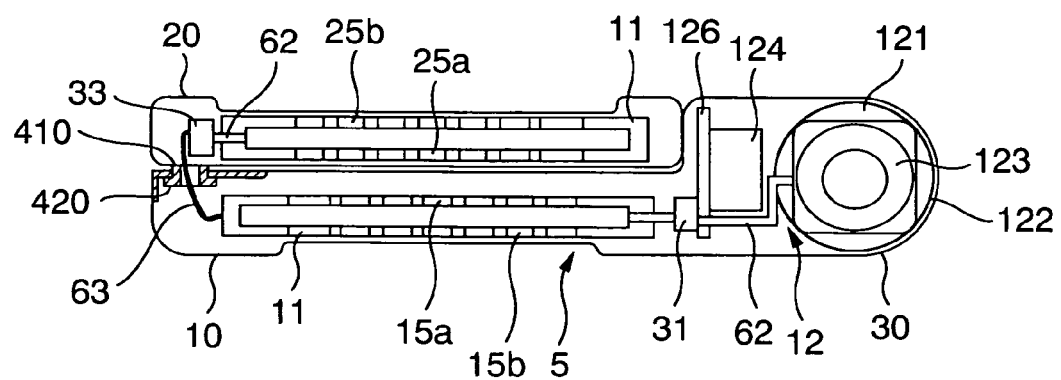
FIG. 13B is a bottom plan view showing an internal layout of a power generator according to the fifth embodiment of the present invention in a closed state.
Figure 14A:
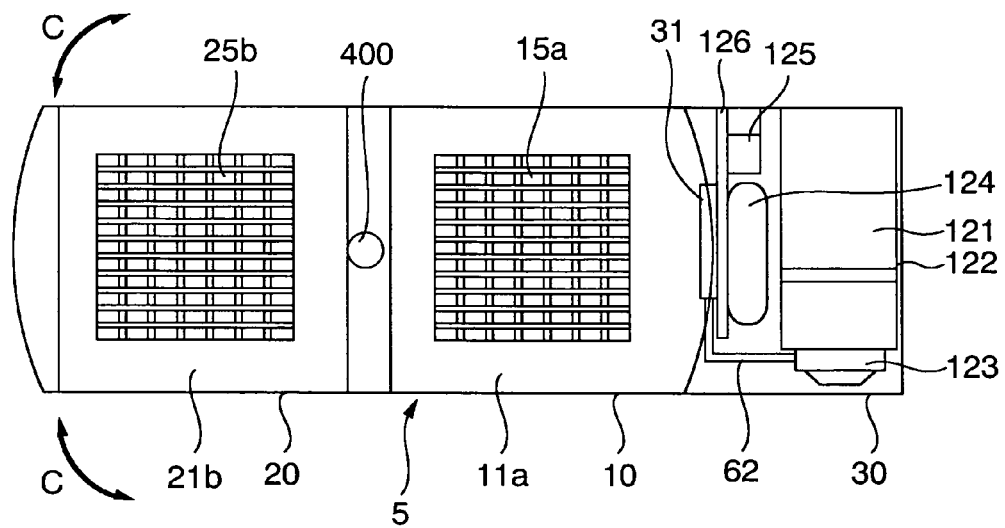
FIG. 14A is a front view showing an internal layout of a power generator according to the fifth embodiment of the present invention in an opened state.
Figure 14B:
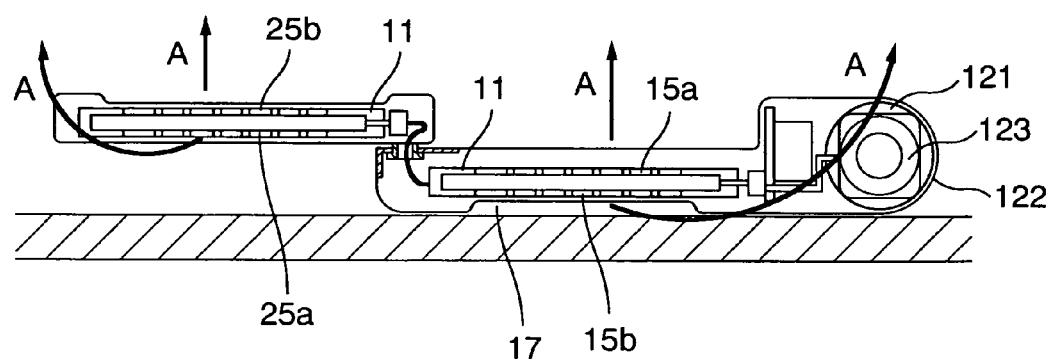
FIG. 14B is a bottom plan view showing an internal layout of a power generator according to the fifth embodiment of the present invention in an opened state.
Figure 15:
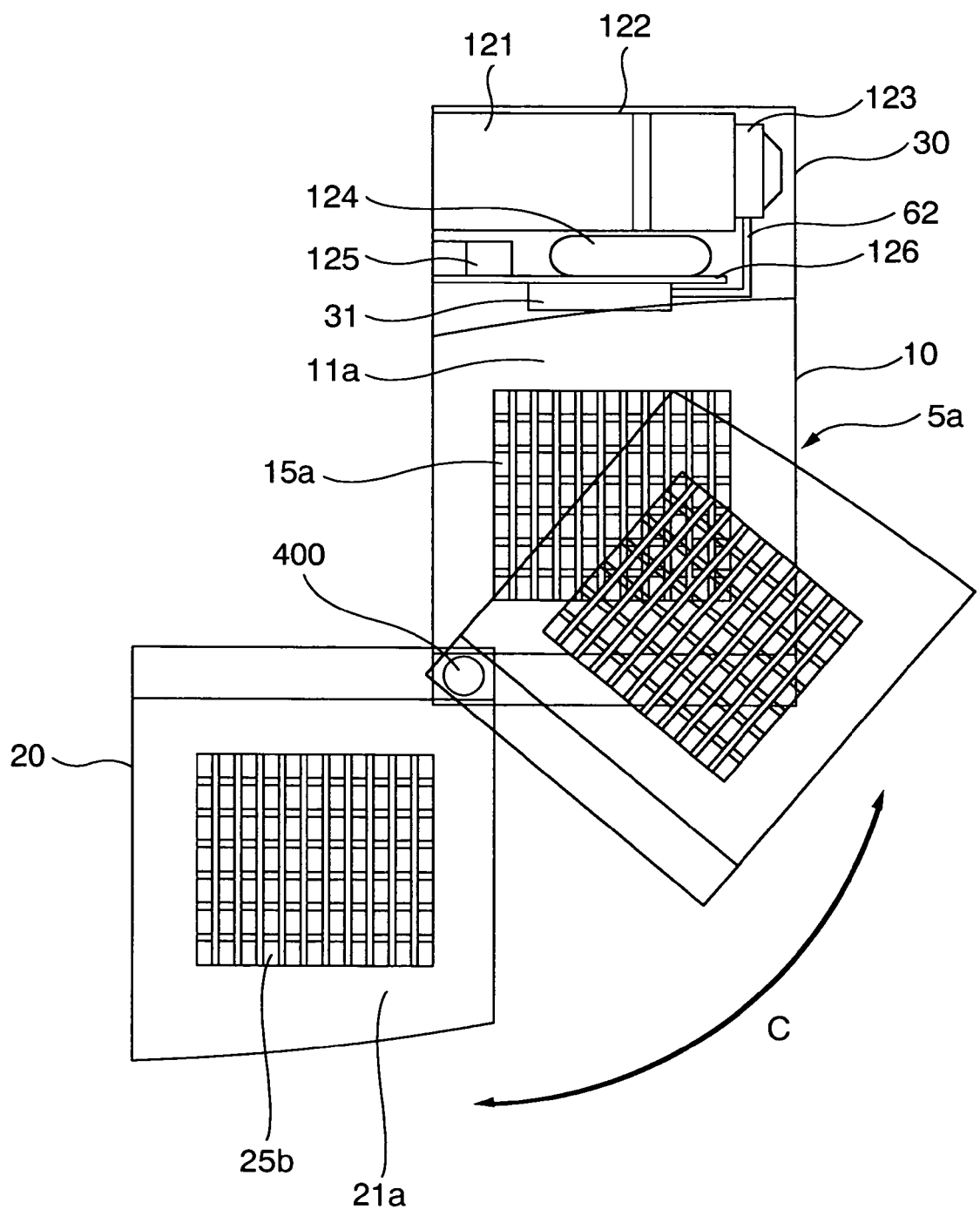
FIG. 15 shows an modified example of the power generator according to the fifth embodiment of the present invention.

Next, a portable power generator according to a fifth embodiment of the present invention will be described with reference to FIGS. 13 to 15. FIG. 13 shows an internal layout of the power generator according to the fifth embodiment in a closed state, FIG. 13A is a front view, and FIG. 13B is a bottom plan view. FIG. 14 shows an internal layout of the power generator according to the fifth embodiment in an opened state, FIG. 14A is a front view, and FIG. 14B is a bottom plan view. FIG. 15 shows an modified example of the power generator according to the fifth embodiment.

The power generator according to the fifth embodiment has a feature in that two power generation casings are connected rotatably in a horizontal direction around a pivot provided perpendicularly to the width of the power generator.

In FIGS. 13 and 14, the power generator 5 according to the embodiment includes a first power generation casing 10 and a second power generation casing 20 having power generation elements 11 therein, a main casing 30 having a fuel supply portion 12 therein, and a connecting portion that connects the casings. Configurations of the first power generation casing 10 and the second power generation casing 20, and a configuration of the fuel supply portion 12 are the same as in the first embodiment, and detailed descriptions thereof will be omitted.

The connecting portion includes a first connecting portion 31 that connects the main casing 30 to the first power generation casing 10, a second connecting portion 400 that connects the first power generation casing 10 to the second power generation casing 20, and a connector 33 that connects the two power generation elements 11.

The second connecting portion 400 includes a bearing portion 410 formed at one end along the length of the first power generation casing 10, and a pivot 420 formed at one end (on the side of the connector) along the length of the second power generation casing 20. The second connecting portion 400 is placed in the middles of one end along the length of the first power generation casing 10 and one end along the length of the second power generation casing 20.

The second connecting portion 400 rotates the second power generation casing 20 in the direction of arrow C, that is, a horizontal direction.

The other end of the second power generation casing 20 (the side of the main casing) is formed into an arcuate shape so that the rotation in the horizontal direction can be smoothly performed.

A power generator 5a in FIG. 15 includes a second connecting portion 400 in a different position, and the second connecting portion 400 is placed at end portions in one ends along the length of power generation casings. The other end along the length of a second power generation casing 10 is formed into an arcuate shape as in the above described embodiment so that the rotation in the horizontal direction (the direction of arrow C) can be performed smoothly.

In the power generator 5 or 5a having such a configuration, for example, the second power generation casing 20 is rotated in the direction of arrow C to open vents 15a and 25a provided in inner surfaces 11a and 21a and outer surfaces 11b and 21b of the two power generation casings, and turn on an unshown switch included in the power generators 5 or 5a to perform power generation. Then, generated electric power is supplied to a compact portable terminal such as a mobile phone or a personal digital assistant, and moisture produced by the power generation is released from vents 15a, 15b, 25a and 25b in the direction of arrow A.

With such a configuration, the plurality of vents can be provided in one power generation casing. This ensures large surface areas of the power generation elements required for power generation, and allows releasing efficiency of moisture produced by the power generation to be increased.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

Embodiment 6

Figure 16A:
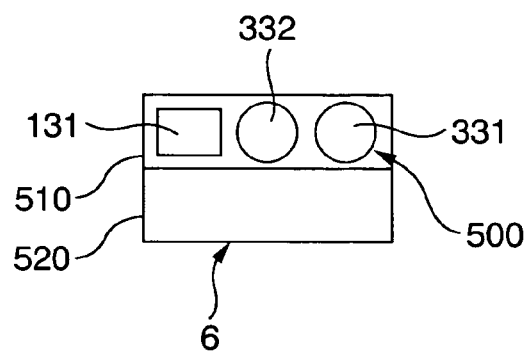
FIG. 16A is a top view showing an appearance of a power generator according to a sixth embodiment of the present invention.
Figure 16B:
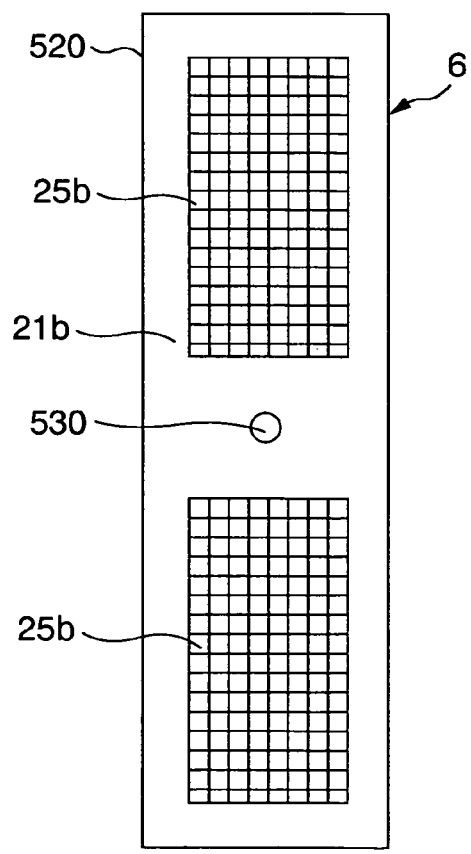
FIG. 16B is a front view showing an appearance of a power generator according to the sixth embodiment of the present invention.
Figure 16C:
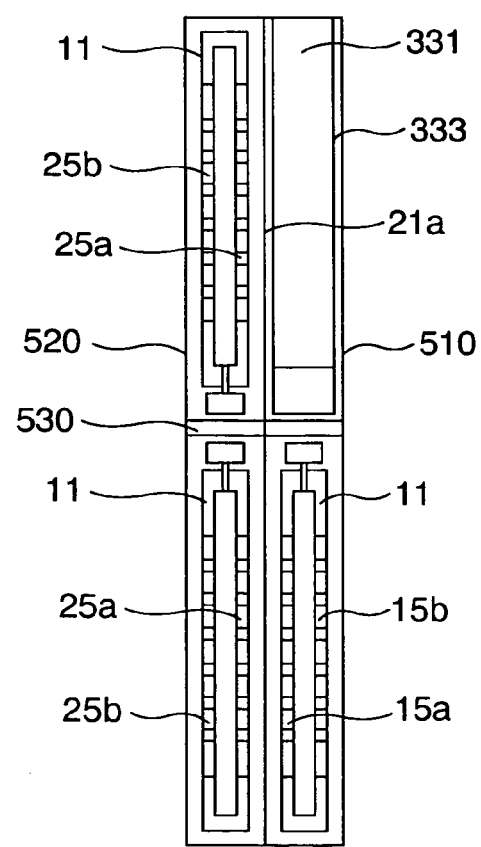
FIG. 16C is a right side view showing an appearance of a power generator according to the sixth embodiment of the present invention.
Figure 17:
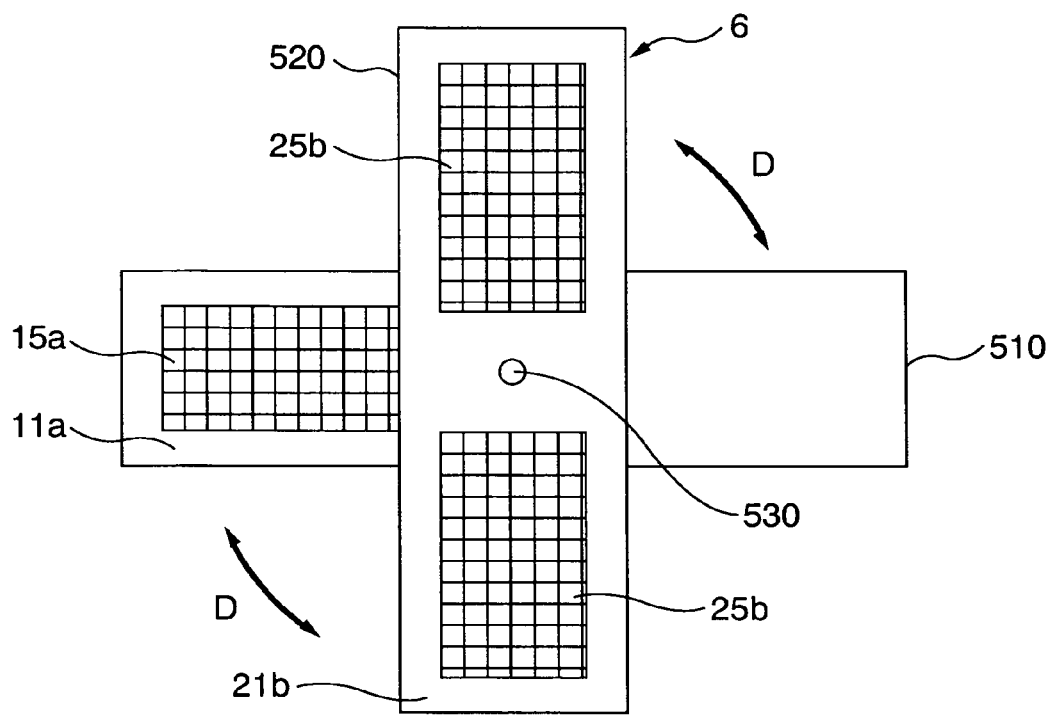
FIG. 17 shows the state of use of the power generator according to the sixth embodiment of the present invention.

Next, a portable power generator according to a sixth embodiment of the present invention will be described with reference to FIGS. 16 and 17. FIG. 16 shows an appearance of the power generator according to the sixth embodiment, FIG. 16A is a top view, FIG. 16B is a front view, and FIG. 16C is a right side view. FIG. 17 shows the state of use of the power generator according to the sixth embodiment.

The power generator according to the sixth embodiment has a feature in that a plurality of power generation elements are placed in one power generation casing.

In FIGS. 16 and 17, the power generator 6 according to the embodiment includes a first casing 510 having a power generation element 11 and a fuel supply portion 500 therein, a second casing 520 having a plurality of power generation elements 11 therein, and a connecting portion 530 that openably and closably connects the two casings. In the embodiment, two power generation elements 11 are shown to be placed in the second power generation casing 520.

The first power generation casing 510 has a substantially rectangular appearance, and has the power generation element 11 and the fuel supply portion 500 that are placed in the front and back and connected by a fuel supply passage constituted by an unshown pipe or fuel tube. The second power generation casing 520 has a substantially rectangular appearance, and has the two power generation elements 11 that are placed in the front and back and connected by a fuel supply passage constituted by an unshown pipe or fuel tube.

The connecting portion 530 is provided in the center of the power generator 6, and connects the first power generation casing 510 to the second power generation casing 520 so that the first power generation casing 510 or the second power generation casing 520 is rotatable in the direction of arrow D (a horizontal direction).

In the power generator 6 having such a configuration, for example, the second power generation casing 520 is rotated in the direction of arrow D to open vents 15a and 25a provided in inner surfaces 11a and 21a of the two power generation casings, and turn on an unshown switch included in the power generator to perform power generation. Then, generated electric power is supplied to a compact portable terminal such as a mobile phone or a personal digital assistant, and moisture produced by the power generation is released from vents 15a, 15b, 25a and 25b in the direction of arrow A.

With such a configuration, the plurality of vents can be provided in the inner surface and the outer surface of one power generation casing. This ensures large surface areas of the power generation elements required for power generation, and allows power generation efficiency and moisture releasing efficiency to be increased.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

Embodiment 7

Figure 18A:
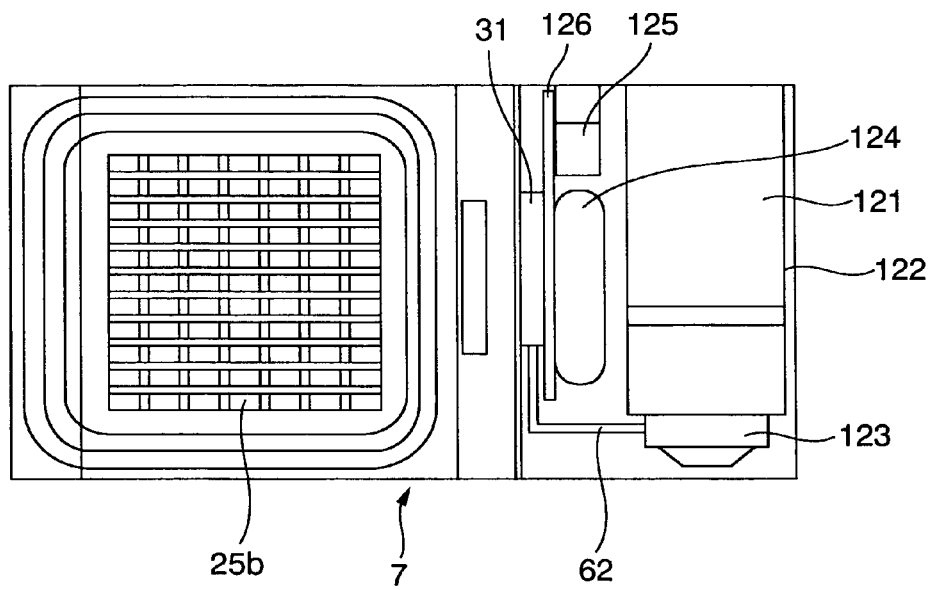
FIG. 18A is a front view showing an internal layout of a power generator according to a seventh embodiment of the present invention in a closed state.
Figure 18B:
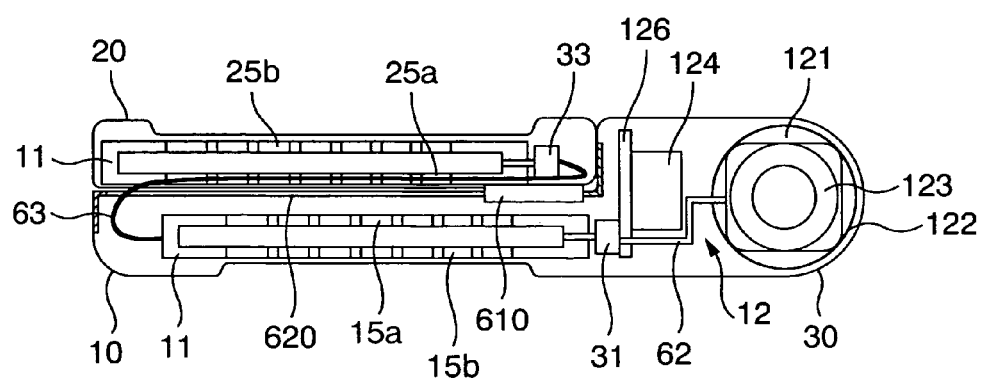
FIG. 18B is a bottom plan view showing an internal layout of a power generator according to the seventh embodiment of the present invention in a closed state.
Figure 19A:
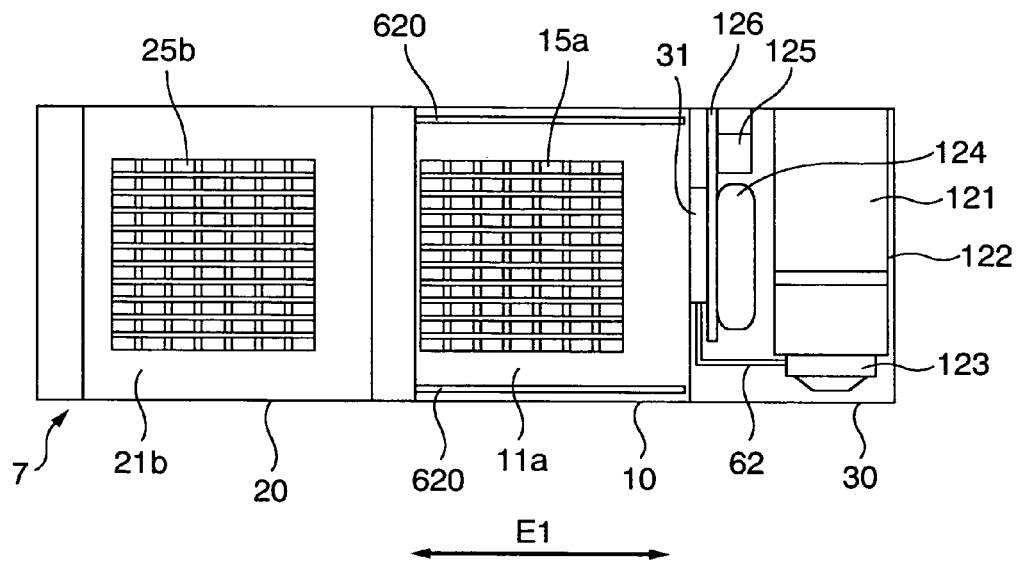
FIG. 19A is a front view showing an internal layout of a power generator according to the seventh embodiment of the present invention in an opened state.
Figure 19B:
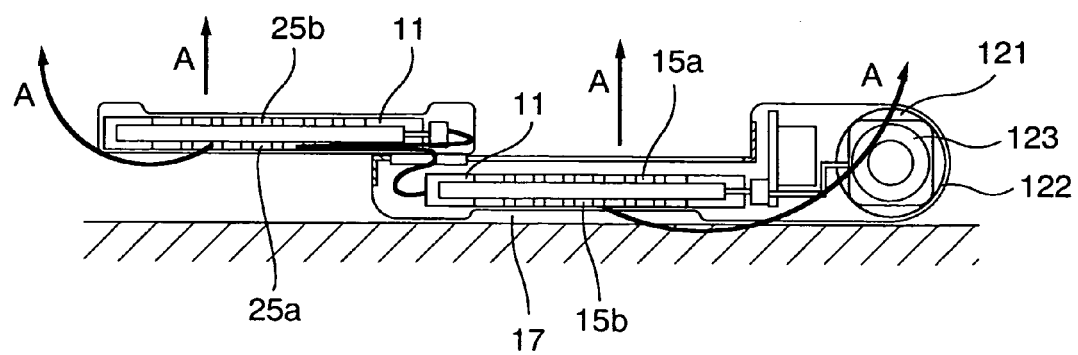
FIG. 19B is a bottom plan view showing an internal layout of a power generator according to the seventh embodiment of the present invention in an opened state.
Figure 20:
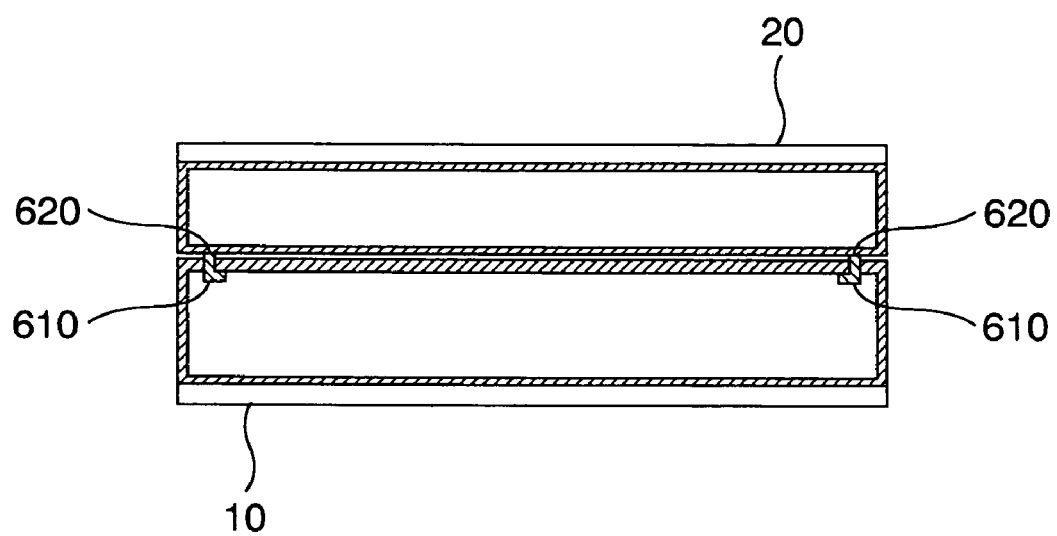
FIG. 20 is a sectional view of the power generator according to the seventh embodiment of the present invention.
Figure 21A:
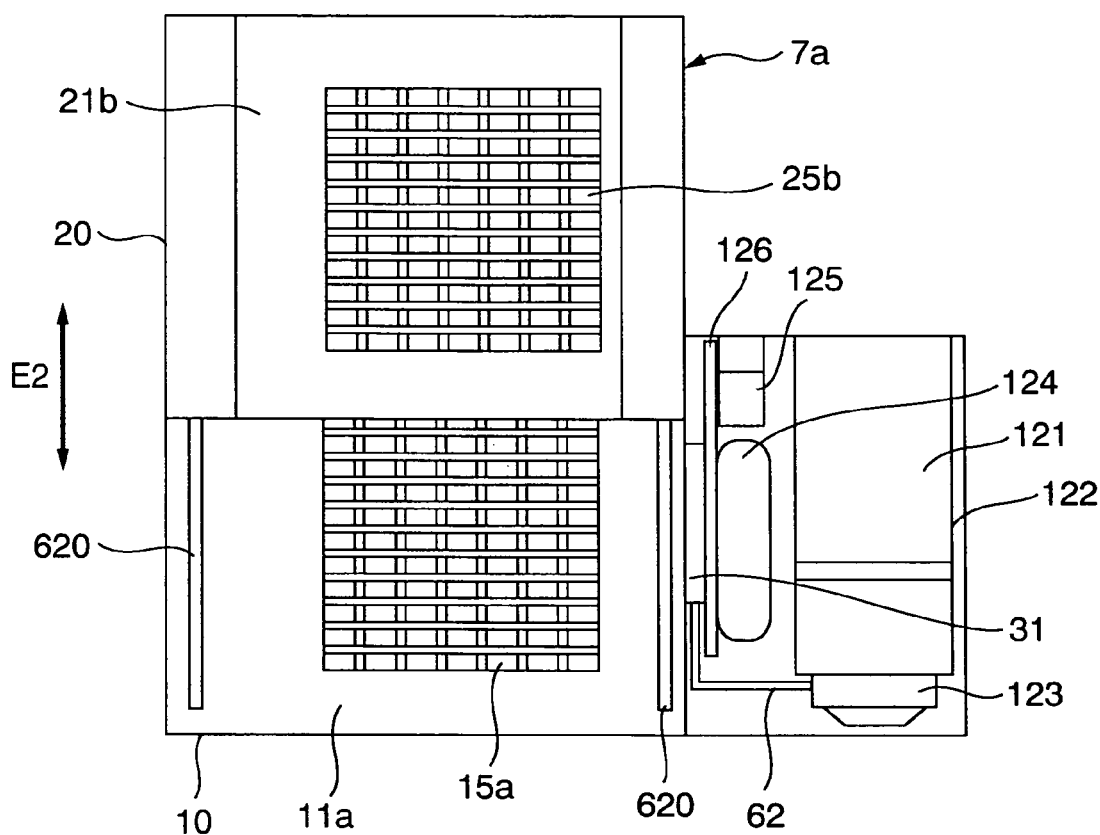
FIG. 21A is front view showing an modified example of the power generator according to the seventh embodiment of the present invention.
Figure 21B:
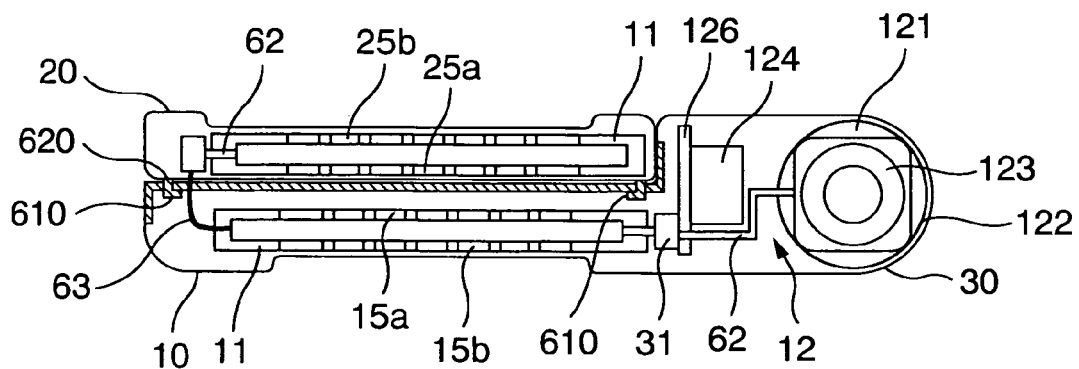
FIG. 21B is bottom plan view showing the modified example of the power generator according to the seventh embodiment of the present invention.

Next, a portable power generator according to a seventh embodiment of the present invention will be described with reference to FIGS. 18 to 21. FIG. 18 shows an internal layout of the power generator according to the seventh embodiment in a closed state, FIG. 18A is a front view, and FIG. 18B is a bottom plan view. FIG. 19 shows an internal layout of the power generator according to the seventh embodiment in an opened state, FIG. 19A is a front view, and FIG. 19B is a bottom plan view. FIG. 20 is a sectional view of the power generator according to the seventh embodiment. FIG. 21 shows an modified example or the power generator according to the seventh embodiment.

The power generator according to the seventh embodiment has a feature in that a first power generation casing and a second power generation casing are slidably connected via a slide mechanism.

In FIGS. 18 to 20, the power generator 7 according to the embodiment includes a first power generation casing 10 and second power generation casing 20 having power generation elements 11 therein, a main casing 30 having a fuel supply portion 12 therein, and a connecting portion that connects the casings. Configurations of the first power generation casing 10 and the second power generation casing 20, and a configuration of the fuel supply portion 12 are the same as in the first embodiment, and detailed descriptions thereof will be omitted.

The connecting portion includes a first connecting portion 31 that connects the main casing 30 to the first power generation casing 10, a second connecting portion that connects the first power generation casing 10 to the second power generation casing 20, and a connector 33 that connects the two power generation elements 11.

The second connecting portion includes a rail 610 provided on the first power generation casing 10 and a sliding portion 620 provided on the second power generation casing 20, and configures a slide mechanism such that the rail 610 and the sliding portion 620 are fitted to connect the second power generation casing 20 slidably in the direction of arrow E1 (along the length of the casing).

A power generator 7a in FIG. 21 includes a second generation casing 20 in a different slide direction, and the second power generation casing 20 is connected slidably in the direction of arrow E2 (along the width of the casing) via a slide mechanism.

In the power generator 7 or 7a having such a configuration, the second power generation casing 20 is slid in the direction of arrow E1 or E2 to open vents 15a and 25a provided in inner surfaces 11a and 21a of the two power generation casings, and turn on an unshown switch included in the power generator 7 or 7a to perform power generation. Then, generated electric power is supplied to a compact portable device such as a mobile phone or a personal digital assistant, and moisture produced by the power generation is released from the vents 15a and 25a, and vents 15b and 25b formed in outer surfaces 11b and 21b in the direction of arrow A (upward).

With such a configuration, as in the above described embodiment, power generation efficiency and moisture releasing efficiency can be increased in use. Also, the power generator may have high portability and a high housing property when not used.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

Embodiment 8

Figure 22A:
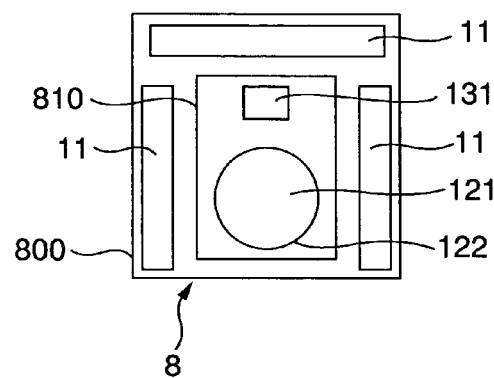
FIG. 22A is a top view showing an appearance of a power generator according to an eighth embodiment of the present invention.
Figure 22B:
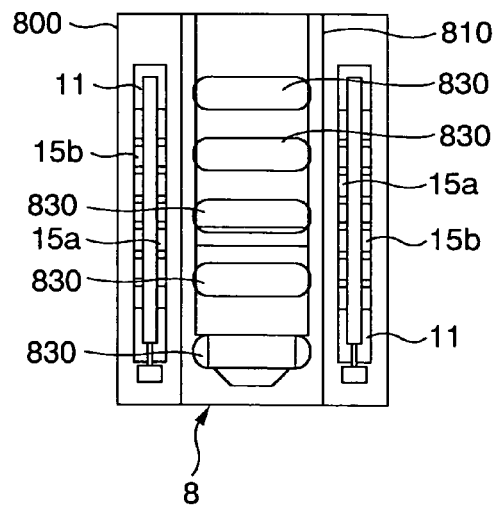
FIG. 22B is a front view showing an appearance of a power generator according to the eighth embodiment of the present invention.
Figure 22C:
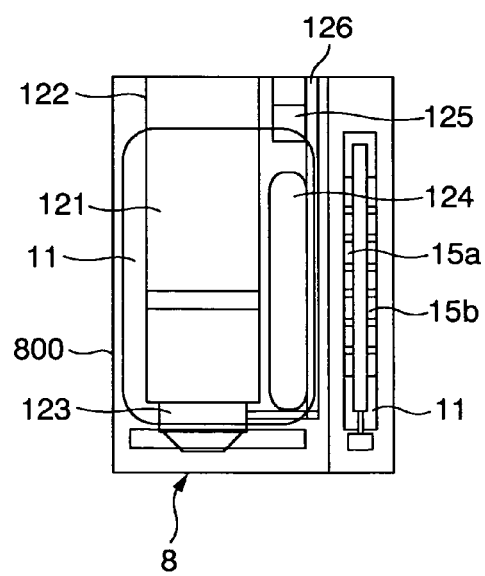
FIG. 22C is a right side view showing an appearance of a power generator according to the eighth embodiment of the present invention.

Next, a portable power generator according to an eighth embodiment of the present invention will be described with reference to FIGS. 22 and 23. FIG. 22 shows an appearance of the power generator according to the eighth embodiment, FIG. 22A is a top view, FIG. 22B is a front view, and FIG. 22C is a right side view. FIG. 23 shows the state of use of the power generator according to the eighth embodiment, FIG. 23A is a front view, and FIG. 23B is a right side view.

The power generator according to the eighth embodiment has a feature in that a main casing having a fuel supply portion is vertically slidably connected.

In FIG. 22, the power generator 8 according to the embodiment includes a power generation casing 800 having a plurality of power generation elements 11 therein, and a main casing 810 slidably mounted to the power generation casing 800. A configuration of the main casing 810 is the same as in the above described embodiments, and detailed descriptions thereof will be omitted.

The power generation casing 800 includes a housing portion 820 that houses the main casing 810, and three power generation elements 11 placed to surround three sides of the housing portion 820. A plurality of vents 830 are provided in the front of the power generation casing 800.

In the power generator 8 having such a configuration, as shown in FIG. 23, the main casing 810 is slid in the direction of arrow F1 (upward) by an unshown slide mechanism to open the vents 830 provided in the front, and turn on an unshown switch included in the power generator 8 to perform power generation. Generated electric power is supplied to a compact portable device such as a mobile phone or a personal digital assistant to charge a battery. Air taken in from the vents 830 provided in the front is guided to the power generation elements 11 to cool the power generation elements 11, and release moisture produced by power generation from vents 15a and 15b in the direction of arrow A (upward).

With such a construction, the plurality of vents can be provided in the inner surface and the outer surface of one power generation casing. This ensures large surface areas of the power generation elements required for power generation, and allows power generation efficiency and moisture releasing efficiency to be increased.

Embodiment 9

Figure 24A:
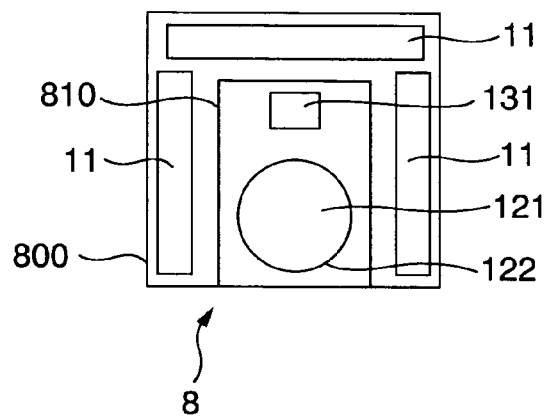
FIG. 24A is a top view showing an appearance of a power generator according to a ninth embodiment of the present invention.
Figure 24B:
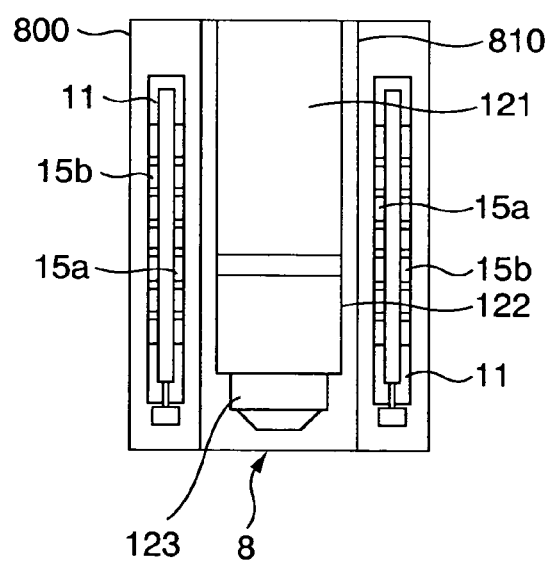
FIG. 24B is a front view showing an appearance of a power generator according to the ninth embodiment of the present invention.
Figure 24C:
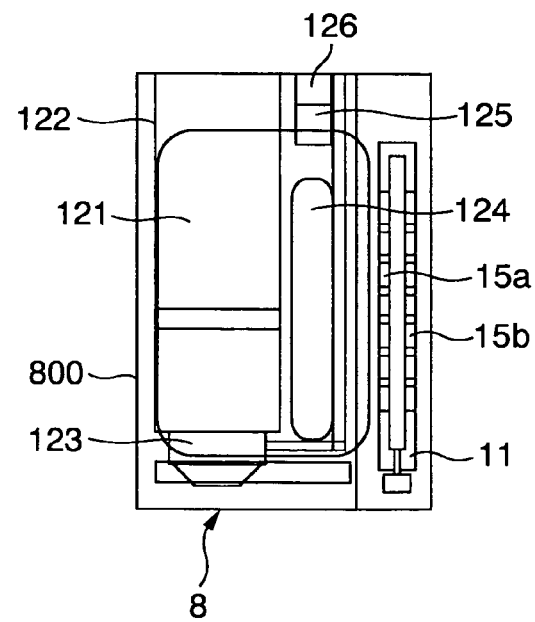
FIG. 24C is a right side view showing an appearance of a power generator according to the ninth embodiment of the present invention.

Next, a portable power generator according to a ninth embodiment of the present invention will be described with reference to FIGS. 24 and 25. FIG. 24 shows an appearance of the power generator according to the ninth embodiment, FIG. 24A is a top view, FIG. 24B is a front view, and FIG. 24C is a right side view. FIG. 25 shows the state of use of the power generator according to the ninth embodiment, FIG. 25A is a front view, and FIG. 25B is a right side view.

The power generator according to the ninth embodiment has a feature in that a fuel supply portion is vertically slidably connected as in the power generator according to the eighth embodiment.

In FIG. 24, the power generator 9 according to the embodiment includes a power generation casing 800 having a plurality of power generation elements 11 therein, and a main casing 810 slidably mounted to the power generation casing 800. A configuration of the main casing 810 is the same as in the above described embodiments, and detailed descriptions thereof will be omitted.

The power generation casing 800 includes a housing portion 850 that houses the main casing 810, and three power generation elements 11 placed to surround three sides of the housing portion 820. The housing portion 850 has a Π-shaped plane shape with an open front.

In the power generator 9 having such a configuration, as shown in FIG. 25, the main casing 810 is slid in the direction of arrow F1 (upward) by an unshown slide mechanism to open the housing portion 850, and turn on an unshown switch included in the power generator 9 to perform power generation. The generated electric power is supplied to a compact portable device such as a mobile phone or a personal digital assistant to charge a battery. Air taken in from the housing portion 850 is guided to the power generation elements 11 to cool the power generation elements 11, and release moisture produced by the power generation from vents 15a and 15b in the direction of arrow A (upward).

Also with such a configuration, the same advantage as in the eighth embodiment can be obtained.

Embodiment 10

Next, a portable power generator according to a tenth embodiment of the present invention will be described with reference to FIG. 26. FIG. 26 shows the power generator according to the tenth embodiment, FIG. 26A is a side view, and FIG. 26B is a side view of the state of use.

The power generator according to the tenth embodiment has a feature in that a first power generation casing and a second power generation casing are structurally separated in use.

In FIG. 26, the power generator 900 according to the embodiment includes a first power generation casing 910 having a power generation element 11 therein, a second power generation casing 920 having a power generation element 11 therein, a main casing 930 having a fuel supply portion therein, and a connecting portion that openably and closably connects the first power generation casing 910 to the second power generation casing 920. Configurations of the first power generation casing 910, the second power generation casing 920, and the main casing 930 are the same as in the above described embodiments, and detailed descriptions thereof will be omitted.

The connecting portion is constituted by a pair of connecting rods 941 mounted to the first power generation casing 910 and the second power generation casing 920 via a pivot 940, and the second power generation casing 920 is moved in the direction of arrow J to enter a state where the first power generation casing 910 and the second power generation casing 920 are structurally separated, that is, a power generation state (state of use).

The connecting portion has a structure in which a fuel supply passage such as a fuel supply pipe or a fuel tube can be provided, and the two power generation elements 11 are connected by the pipe or the fuel tube.

In the power generator 900 having such a configuration, the second power generation casing 920 is moved in the direction of arrow G via the pair of connecting rods 941 to turn on an unshown included switch to perform power generation. Moisture produced by the power generation is released from vents 15a and 15b.

With such a configuration, a space can be provided around the power generation casings, thereby increasing moisture releasing efficiency.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

Embodiment 11

Next, a power generator according to an eleventh embodiment of the present invention will be described with reference to FIG. 27. FIG. 27 shows the power generator according to the eleventh embodiment, FIG. 27A is a side view, and FIG. 27B is a side view of the state of use.

The power generator according to the eleventh embodiment has a feature in that a first casing and a second casing are separated in use like the power generator according to the tenth embodiment.

In FIG. 27, the power generator 1000 according to the embodiment includes a first power generation casing 910 having a power generation element 11 therein, a second power generation casing 920 having a power generation element 11 therein, a main casing 930 having a fuel supply portion therein, and a connecting portion that openably and closably connects the first power generation casing 910 to the second power generation casing 920. Configurations of the first power generation casing 910, the second power generation casing 920, and the main casing 930 are the same as in the above described embodiments, and detailed descriptions thereof will be omitted.

The connecting portion is constituted by two connecting rods 1020 connected via a pivot 1010, and groove portions 1030 to which the two connecting rods 1020 are mounted, and the connecting rods 1020 are moved along the groove portions 1030 to enter a state where the first power generation casing 910 and the second power generation casing 920 are structurally separated (a power generation state).

The connecting portion has a structure in which a fuel supply pipe or a fuel tube can be provided, and the two power generation elements 11 are connected by the pipe or the fuel tube.

In the power generator 1000 having such a configuration, the second power generation casing 920 is moved in the direction of arrow G via the two connecting rods 1020 to turn on an unshown included switch to perform power generation. Moisture produced by the power generation is released from vents 15a and 25a (see FIG. 26).

With such a configuration, a space can be provided around the power generation casings as in the tenth embodiment, thereby increasing moisture releasing efficiency.

In the embodiment, the structure in which the vents are provided in the inner surfaces and the outer surfaces of the power generation casings is used, but vents may be provided only in the inner surfaces of the power generation casings. Also with such a configuration, power generation can be performed as in the above described embodiment, and the same advantages can be obtained.

As described above, the power generator according to the present invention includes the plurality of power generation elements, and the fuel supply portion that communicates with the plurality of power generation elements through the fuel supply passage (the pipe), the plurality of power generation elements are housed in the plurality of independent power generation casings having the vent portions (the vents), and the plurality of power generation casings are movably connected via the connecting portion so as to enter a housing state where the casings are placed on top of each other and a power generation state where the casings are separated (opened). Then, the fuel supply portion is provided in any one of the plurality of power generation casings, or housed in the main casing independent of the plurality of power generation casings, and movably connected to at least one of the power generation casings via the connecting portion.

The connecting portion foldably or slidably connects the plurality of power generation casings.

The vent portions are provided in the inner surfaces that are concealed in the housing state where the plurality of power generation casings are placed on top of each other, and the fuel supply passage is provided via the connector.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power generator comprising:
   a first power generation casing having a power generation element therein;
   a second power generation casing having a power generation element therein; and
   a fuel supply portion that supplies fuel to said first power generation casing and said second power generation casing,
   wherein said first power generation casing and said second power generation casing are connected via a connecting portion so as to enter a housing state where the casings are placed on top of each other and a power generation state where the casings are separated, and have vent portions provided in inner surfaces that are exposed in said power generation state,
   said fuel supply portion is mounted to either said first power generation casing or said second power generation casing, and
   said power generator further comprises a switch that switches said first power generation casing and said second power generation casing from said housing state to said power generation state to supply the fuel and start power generation.

2. The power generator according to claim 1, wherein the power generation element of said first power generation casing, the power generation element of said second power generation casing, and said fuel supply portion are connected via a connector, and
   said connector includes a fuel supply passage that supplies the fuel from said fuel supply portion to the power generation element of said first power generation casing and the power generation element of said second power generation casing.

3. The power generator according to claim 2, wherein said fuel supply portion includes a removable fuel cartridge, and the fuel is supplied from the fuel cartridge.

4. The power generator according to claim 2, wherein the fuel is supplied to said fuel supply portion from a dropper.

5. The power generator according to claim 1, wherein said vent portions take in air for cooling said power generation elements, and release moisture produced by power generation.

6. The power generator according to claim 1, wherein said connecting portion foldably connects said first power generation casing to said second power generation casing.

7. The power generator according to claim 1, wherein said connecting portion slidably connects said first power generation casing to said second power generation casing.

8. The power generator according to claim 1, wherein said connecting portion rotatably connects said first power generation casing to said second power generation casing.

9. A power generator comprising:
   a first power generation casing having a power generation element therein;
   a second power generation casing having a power generation element therein; and
   a connecting casing having a fuel supply portion that supplies fuel to said first power generation casing and said second power generation casing,
   wherein said connecting casing connects one end of said first power generation casing to one end of said second power generation casing so as to enter a first state where said first power generation casing and said second power generation casing are folded and a second state where said first power generation casing and said second power generation casing are opened,
   said first power generation casing and said second power generation casing have vent portions in inner surfaces that are concealed in said first state and exposed in said second state, and
   said power generator further comprises a switch that switches said first power generation casing and said second power generation casing from said first state to said second state to supply the fuel and start power generation.

10. The power generator according to claim 9, wherein said vent portions take in air for cooling said power generation elements, and release moisture produced by power generation.

11. A power generator comprising:

a first power generation casing having a power generation element therein;

a second power generation casing having a power generation element therein;

a connecting portion that connects said first power generation casing to said second power generation casing; and a main casing having a fuel supply portion that supplies fuel to said first power generation casing and said second power generation casing, wherein said connecting portion connects one end of said first power generation casing to one end of said second power generation casing so as to enter a first state where said first power generation casing and said second power generation casing are folded and a second state where said first power generation casing and said second power generation casing are opened, said first power generation casing and said second power generation casing have vent portions in inner surfaces that are concealed in said first state and exposed in said second state, said main casing has an insertion port for a fuel cartridge that supplies the fuel to said first power generation casing and said second power generation casing, and said power generator further comprises a switch that switches said first power generation casing and said second power generation casing from said first state to said second state to supply the fuel from said fuel cartridge and start power generation.

12. The power generator according to claim 11, wherein said vent portions take in air for cooling said power generation elements, and release moisture produced by power generation.

* * * * *